(12) United States Patent
Ueda et al.

(10) Patent No.: US 8,350,518 B2
(45) Date of Patent: Jan. 8, 2013

(54) CONTROL APPARATUS FOR MATRIX CONVERTER

(75) Inventors: Yozo Ueda, Kitakyushu (JP); Kenichi Imanishi, Kitakyushu (JP); Ryuji Suenaga, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 210 days.

(21) Appl. No.: 13/029,456

(22) Filed: Feb. 17, 2011

(65) Prior Publication Data

US 2011/0199032 A1 Aug. 18, 2011

(30) Foreign Application Priority Data

Feb. 17, 2010 (JP) ................................. 2010-033002
Nov. 19, 2010 (JP) ................................. 2010-258971

(51) Int. Cl.
*H02M 5/27* (2006.01)
*H02H 7/10* (2006.01)

(52) U.S. Cl. ........ 318/810; 318/800; 318/803; 363/159; 363/56.05; 363/50

(58) Field of Classification Search .................. 318/430, 318/759, 375–377, 798–803, 807, 808, 810, 318/811; 363/159, 34, 44, 39, 50, 52, 54, 363/56.03, 56.04, 56.05, 65, 67, 68, 70–72
See application file for complete search history.

(56) References Cited

U.S. PATENT DOCUMENTS

| | | | | |
|---|---|---|---|---|
| 5,594,636 A * | 1/1997 | Schauder | ...................... | 363/160 |
| 5,638,263 A * | 6/1997 | Opal et al. | ...................... | 363/65 |
| 5,969,966 A * | 10/1999 | Sawa et al. | ...................... | 363/163 |
| 6,014,323 A * | 1/2000 | Aiello et al. | ...................... | 363/71 |
| 6,351,397 B1 | 2/2002 | Sawa et al. | | |
| 6,417,644 B2 * | 7/2002 | Hammond et al. | ........... | 318/759 |
| 7,307,400 B2 * | 12/2007 | Rastogi et al. | ................ | 318/801 |
| 7,405,498 B2 * | 7/2008 | Rastogi et al. | ................ | 307/105 |
| 7,423,391 B2 * | 9/2008 | Oyobe et al. | ................ | 318/139 |
| 7,508,147 B2 * | 3/2009 | Rastogi et al. | ................ | 318/376 |
| 7,633,782 B1 * | 12/2009 | Herbert | ........................ | 363/125 |
| 2004/0026929 A1* | 2/2004 | Rebsdorf et al. | ................ | 290/44 |
| 2005/0237774 A1* | 10/2005 | Lacaze et al. | ................. | 363/148 |
| 2005/0248969 A1* | 11/2005 | Lacaze | .......................... | 363/152 |

(Continued)

FOREIGN PATENT DOCUMENTS

JP 2000-139076 5/2000

(Continued)

*Primary Examiner* — Eduardo Colon Santana
(74) *Attorney, Agent, or Firm* — Ditthavong Mori & Steiner, P.C.

(57) ABSTRACT

A control apparatus for a series-connected multi-level matrix converter includes each voltage commanding device provided for each of single-phase matrix converters to generate a voltage reference to each of the single-phase matrix converters. The series-connected multi-level matrix converter includes the single-phase matrix converters. Each of the single-phase matrix converters includes a snubber circuit and a DC voltage detecting section configured to detect a DC voltage of the snubber circuit to output a DC voltage detection value. ADC over-voltage detector is configured to output a DC over-voltage signal when the DC voltage detection value exceeds a set voltage value. A voltage modifying device is, when the DC over-voltage signal is outputted, configured to decrease the voltage reference to a corresponding single-phase matrix converter among the single-phase matrix converters based on a deviation between the DC voltage detection value and the set voltage value.

20 Claims, 13 Drawing Sheets

U.S. PATENT DOCUMENTS

| | | | |
|---|---|---|---|
| 2008/0049460 A1* | 2/2008 | Mohan et al. | 363/34 |
| 2008/0055953 A1* | 3/2008 | Lacaze | 363/152 |
| 2008/0247211 A1* | 10/2008 | Lacaze | 363/150 |
| 2010/0076612 A1* | 3/2010 | Robertson | 700/286 |

FOREIGN PATENT DOCUMENTS

| | | |
|---|---|---|
| JP | 2006-129614 | 5/2006 |

* cited by examiner

US 8,350,518 B2

CONTROL APPARATUS FOR MATRIX CONVERTER

CROSS-REFERENCE TO RELATED APPLICATIONS

The present application claims priority under 35 U.S.C. §119 to Japanese Patent Applications No. 2010-033002, filed on Feb. 17, 2010 and Japanese Patent Applications No. 2010-258971, filed on Nov. 19, 2010. The contents of these applications are incorporated herein by reference in their entirety.

BACKGROUND OF THE INVENTION

1. Field of the Invention

The present invention relates to a control apparatus for a matrix converter.

2. Discussion of the Background

A control apparatus for a matrix converter is disclosed in, for example, Japanese Unexamined Patent Publication No. 2000-139076. The control apparatus for a matrix converter includes a snubber circuit having a rectifier and a capacitor. Surge voltages generated on the input and output sides of the matrix converter accompanying switching of the matrix converter are absorbed by the capacitor via the rectifying circuit, and the peak value of the surge voltage is suppressed.

There is also a control apparatus for a matrix converter disclosed in, for example, Japanese Unexamined Patent Publication No. 2006-129614. In the control apparatus for a matrix converter, a rectifier in which a snubber circuit is also connected on a power source side has a semiconductor switch. When a voltage of the capacitor detected by a voltage detecting circuit is equal to or less than a predetermined value, the semiconductor switches are turned off, and the rectifier is operated as a diode rectifier. When the DC voltage exceeds the predetermined value, the semiconductor switches are switched to regenerate the energy stored in the capacitor on the power source side.

SUMMARY OF THE INVENTION

According to one aspect of the present invention, a control apparatus for a series-connected multi-level matrix converter includes each voltage commanding device, a DC over-voltage detector, and a voltage modifying device. The each voltage commanding device is provided for each of single-phase matrix converters to generate a voltage reference to each of the single-phase matrix converters, from an output phase voltage reference for an output phase voltage of the series-connected multi-level matrix converter. The series-connected multi-level matrix converter includes the single-phase matrix converters whose outputs are serially connected and which are connected to a plurality of secondary windings of a transformer and constructing output phases. Each of the single-phase matrix converters includes a main circuit, a snubber circuit, and a DC voltage detecting section. The main circuit has a bidirectional switching element. The snubber circuit is connected to an input and an output of the main circuit to suppress a surge voltage. The DC voltage detecting section is configured to detect a DC voltage of the snubber circuit to output a DC voltage detection value. The transformer has a primary winding connected to a three-phase AC power source and the plurality of secondary windings. The DC over-voltage detector is configured to output a DC over-voltage signal when the DC voltage detection value exceeds a set voltage value which is preliminarily set. The voltage modifying device is, when the DC over-voltage signal is outputted, configured to decrease the voltage reference to a corresponding single-phase matrix converter among the single-phase matrix converters based on a deviation between the DC voltage detection value and the set voltage value.

According to another aspect of the present invention, a control apparatus for a series-connected multi-level matrix converter includes an output current detector, a first regeneration judging device, a torque reference limit device, and an output voltage commanding device. The output current detector is configured to detect an output current to a three-phase motor to be driven to output an output current detection value. The first regeneration judging device is configured to calculate a phase difference between an output voltage and an output current based on an output phase voltage reference for an output phase voltage of the series-connected multi-level matrix converter and the output current detection value. The first regeneration judging device is configured to determine that the series-connected multi-level matrix converter is in one of motoring operation and regenerating operation to output a determination result. The series-connected multi-level matrix converter includes single-phase matrix converters whose outputs are serially connected and which are connected to a plurality of secondary windings of a transformer and constructing output phases. Each of the single-phase matrix converters includes a main circuit, a snubber circuit, and a DC voltage detecting section. The main circuit has a bidirectional switching element. The snubber circuit is connected to an input and an output of the main circuit to suppress a surge voltage. The DC voltage detecting section is configured to detect a DC voltage of the snubber circuit to output a DC voltage detection value. The transformer has a primary winding connected to a three-phase AC power source and the plurality of secondary windings. The torque reference limit device is, when the determination result is the regenerating operation and the DC voltage detection value is larger than a set voltage value which is preliminarily set, configured to change a torque reference for a torque which is outputted from the three-phase motor to a new torque reference to decrease the torque based on a deviation between the DC voltage detection value and the set voltage value in a corresponding single-phase matrix converter among the single-phase matrix converters. The torque reference limit device is configured to output the new torque reference. The output voltage commanding device is configured to generate the output phase voltage reference from the new torque reference.

According to further aspect of the present invention, a control apparatus for a matrix converter includes an output current detector, a first regeneration judging device, a torque reference limit device, and an output voltage commanding device. The output current detector is configured to detect an output current to a three-phase motor to be driven to output an output current detection value. The first regeneration judging device is configured to calculate a phase difference between an output voltage and an output current based on an output phase voltage reference for an output phase voltage of the matrix converter and the output current detection value. The first regeneration judging device is configured to determine that the matrix converter is in one of motoring operation and regenerating operation to output a determination result. The matrix converter includes a main circuit, a snubber circuit, and a DC voltage detecting section. The main circuit is connected to a three-phase AC power source and has a bidirectional switching element. The snubber circuit is connected to an input and an output of the main circuit to suppress a surge voltage. The DC voltage detecting section is configured to detect a DC voltage of the snubber circuit to output a DC voltage detection value. The torque reference limit device is, when the determination result is the regenerating operation and the DC voltage detection value is larger than a set voltage value which is preliminarily set, configured to change a torque reference for a torque which is outputted from the three-phase motor to a new torque reference to decrease the torque based on a deviation between the DC voltage detection value and the set voltage value in the matrix converter. The torque reference limit device is configured to output the new torque reference. The output voltage commanding device is configured to generate the output phase voltage reference from the new torque reference.

According to the other aspect of the present invention, a control apparatus for a parallel-connected multi-level matrix converter includes an output current detector, a first regeneration judging device, a torque reference limit device, and an output voltage commanding device. The output current detector is configured to detect an output current to a three-phase motor to be driven to output an output current detection value. The first regeneration judging device is configured to calculate a phase difference between an output voltage and an output current based on an output phase voltage reference for an output phase voltage of the parallel-connected multi-level matrix converter and the output current detection value. The first regeneration judging device is configured to determine that the parallel-connected multi-level matrix converter is in one of motoring operation and regenerating operation to output a determination result. The parallel-connected multi-level matrix converter includes matrix converters whose outputs are serially connected. Each of the matrix converters includes a main circuit, a snubber circuit, and a DC voltage detecting section. The main circuit has a bidirectional switching element. The snubber circuit is connected to an input and an output of the main circuit to suppress a surge voltage. The DC voltage detecting section is configured to detect a DC voltage of the snubber circuit to output a DC voltage detection value. The torque reference limit device is, when the determination result is the regenerating operation and the DC voltage detection value is larger than a set voltage value which is preliminarily set, configured to change a torque reference for a torque which is outputted from the three-phase motor to a new torque reference to decrease the torque based on a deviation between the DC voltage detection value and the set voltage value in a corresponding matrix converter among the matrix converters. The torque reference limit device is configured to output the new torque reference. The output voltage commanding device is configured to generate the output phase voltage reference from the new torque reference.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
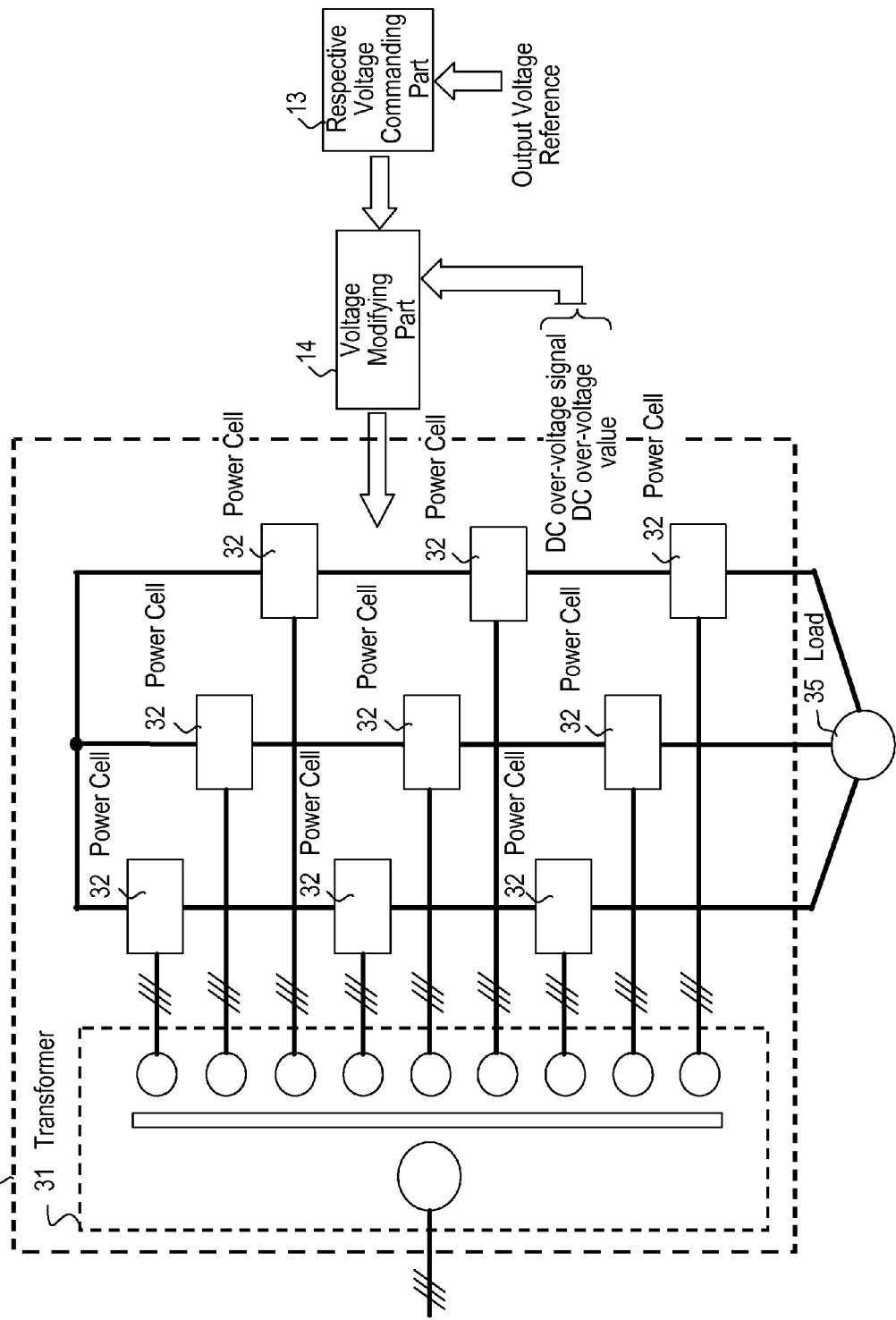
FIG. 1 is a block diagram of a control apparatus for a series-connected multi-level matrix converter as a first embodiment of the present invention.

Embodiments will now be described with reference to the accompanying drawings, wherein like reference numerals designate corresponding or identical elements throughout the various drawings.

FIG. 1 is a block diagram of a control apparatus for a series-connected multi-level matrix converter as a first embodiment. In the diagram, a control apparatus for a series-connected multi-level matrix converter has a series-connected multi-level matrix converter 34, a respective voltage commanding part 13, and a voltage modifying part 14. The series-connected multi-level matrix converter has a transformer 31 and a plurality of power cells 32. The transformer 31 has a plurality of secondary windings for transforming an input voltage to an input voltage of each of the power cells. The power cell 32 is driven by a single-phase matrix converter which receives a secondary voltage of the transformer 31 and outputs a single-phase AC voltage, and a load 35 is driven by the series-connected multi-level matrix converter 34, can generate regenerative operation, and is connected to the output side of the series-connected multi-level matrix converter 34.

The respective voltage commanding part 13 uses an output phase voltage reference of the series-connected multi-level matrix converter 34 and generates a voltage reference to each of the power cells 32. The output phase voltage reference is generated on the output phase basis by a not-shown output voltage commanding part of the series-connected multi-level matrix converter 34. In the case where the load 35 is a motor, the output voltage commanding part can employ known methods such as a method of generating an output phase voltage reference in accordance with a V/f constant control law using a voltage proportional to a frequency reference as a voltage reference; a method according to a vector control law with a PG, of detecting a speed of the motor, generating a torque reference of the motor from a speed reference and the detected speed, and generating an output phase voltage reference from the torque reference and an excitation reference of the motor; and a method according to a PG-less vector control law, of detecting a current of the motor and generating an output phase voltage command from a frequency reference and the detected current. In the case where the load 35 is not a motor, for example, there is a case such that a series-connected multi-level matrix converter is used for interconnection of a system of irregular input power generation such as wind generation or wave-power generation, and enters a regenerative operation state during bidirectional power conversion. The load 35 may be any load if the load 35 requires a phase voltage as an output even in such a case. The respective voltage commanding part 13 divides an output phase voltage command issued at each output phase by the number of the power cells 32 connected to the output phases (three in the embodiment of FIG. 1), and sets the resultant value as a respective voltage reference to each of the power cells 32 connected to the phases. The voltage modifying part 14 generates a final voltage command from the respective voltage references. The details of this operation will be described later.

Figure 2:
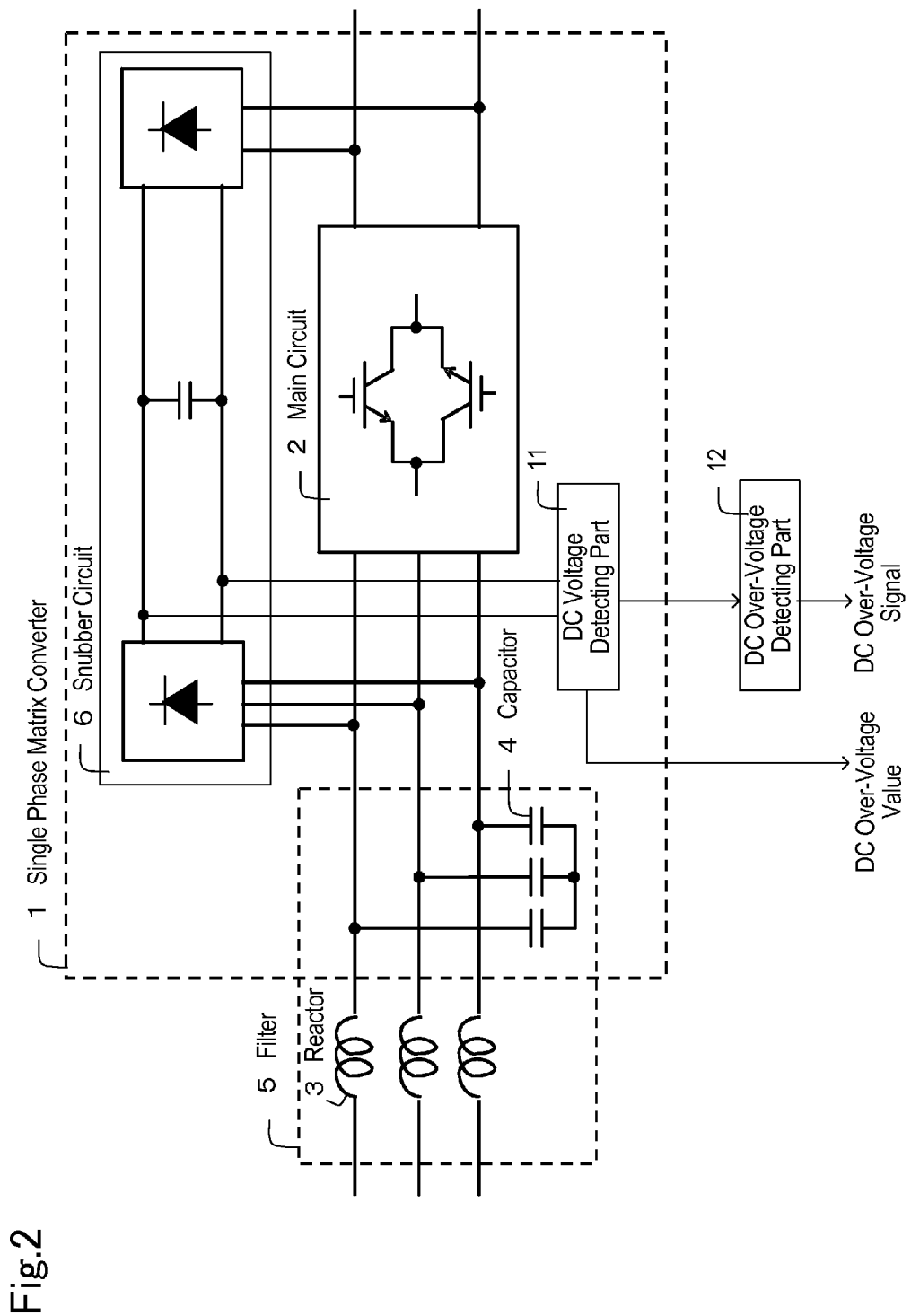
FIG. 2 is a detailed diagram of a power cell of the series-connected multi-level matrix converter.

FIG. 2 is a detailed diagram of the power cell 32 in the first embodiment. In the diagram, the power cell has a single phase matrix converter 1 and a DC over-voltage detecting part 12. The single phase matrix converter 1 outputs a single-phase alternating voltage from a three-phase input power source, and has a main circuit 2, an input filter 5, a snubber circuit 6, and a DC voltage detecting part 11. The main circuit 2 is made by a bidirectional semiconductor switching element, driven by a gate signal obtained by generally-known pulse width modulating means of the matrix converter based on the final voltage reference obtained by the voltage modifying part 14, and performs bidirectional power conversion. The input filter 5 has a reactor 3 and a capacitor 4 and is provided between a three-phase input power source and the input side of the single phase matrix converter 1. As the reactor 3, there are a reactor which is installed on the inside of the single phase matrix converter 1, and a reactor which is installed on the outside of the single phase matrix converter 1, using the reactance of a power supply or, in the case of the series-connected multi-level matrix converter 34 shown in FIG. 1, using leak reactance of the transformer 31. The reactors have the same circuit configuration but are installed in different places. The embodiment of the present invention can be therefore applied to both of the reactors. The snubber circuit 6 absorbs a surge voltage generated by a switching of the main circuit 2. The snubber circuit 6 may be a known one. For example, there is a snubber circuit of a type of accumulating surge energy in a capacitor. The DC voltage detecting part 11 detects a DC voltage generated across terminals of the capacitor in the snubber circuit 6, performs conversion of a signal level by a voltage dividing circuit and, as necessary, insulation by an isolator, and outputs the resultant as a DC voltage detection value. When the DC voltage detection value outputted from the DC voltage detecting part 11 is larger than a set voltage value $V_{ref}$, the DC over-voltage detecting part 12 generates a DC over-voltage signal as a logic signal.

Generally, a state of a DC voltage of the snubber circuit 6 of each power cell 32 is one of the following two states:
$S_1$: the DC voltage detection value is equal to or less than the set voltage value $V_{ref}$
$S_2$: the DC voltage detection value is larger than the set voltage value $V_{ref}$ The DC over-voltage detecting part 12 in FIG. 2 detects whether the state is the state $S_1$ or $S_2$, turns off the DC over-voltage signal in the state $S_1$, and turns on the DC over-voltage signal in the state $S_2$. The DC voltage detecting part 11 sets, as a DC over-voltage, the DC voltage detection value generated when the DC over-voltage signal is on. It is sufficient to set the set voltage value $V_{ref}$ to a value larger than the possible maximum value of DC voltages of the snubber circuit 6 in the allowable operation range of the series-connected multi-level matrix converter 34. The power cell 32 has, on the input side, the filter 5 as a resonance circuit having a resonance frequency determined by inductance L of the reactor 3 and the capacitance C of the capacitor 4. An input voltage of the power cell 32 has a waveform obtained by superimposing oscillating components of the resonance frequency on a secondary voltage of the transformer 31 by the switching operation of the main circuit 2, and the amplitude of the oscillating component changes according to the size of the load on the series-connected multi-level matrix converter 34. Therefore, the peak value of a voltage across input lines of the power cell 32 becomes larger than that of a voltage across the secondary lines of the transformer 31, and the DC voltage of the snubber circuit 6 obtained by rectifying the input voltage also becomes larger than a rectified voltage determined by the secondary voltage value of the transformer 31. From the above, it is sufficient to set, as the set voltage value $V_{ref}$, a value larger than the maximum value of the DC voltage of the snubber circuit 6 determined by the maximum amplitude value in consideration of the maximum value of the oscillation voltage amplitude.

Figure 8:
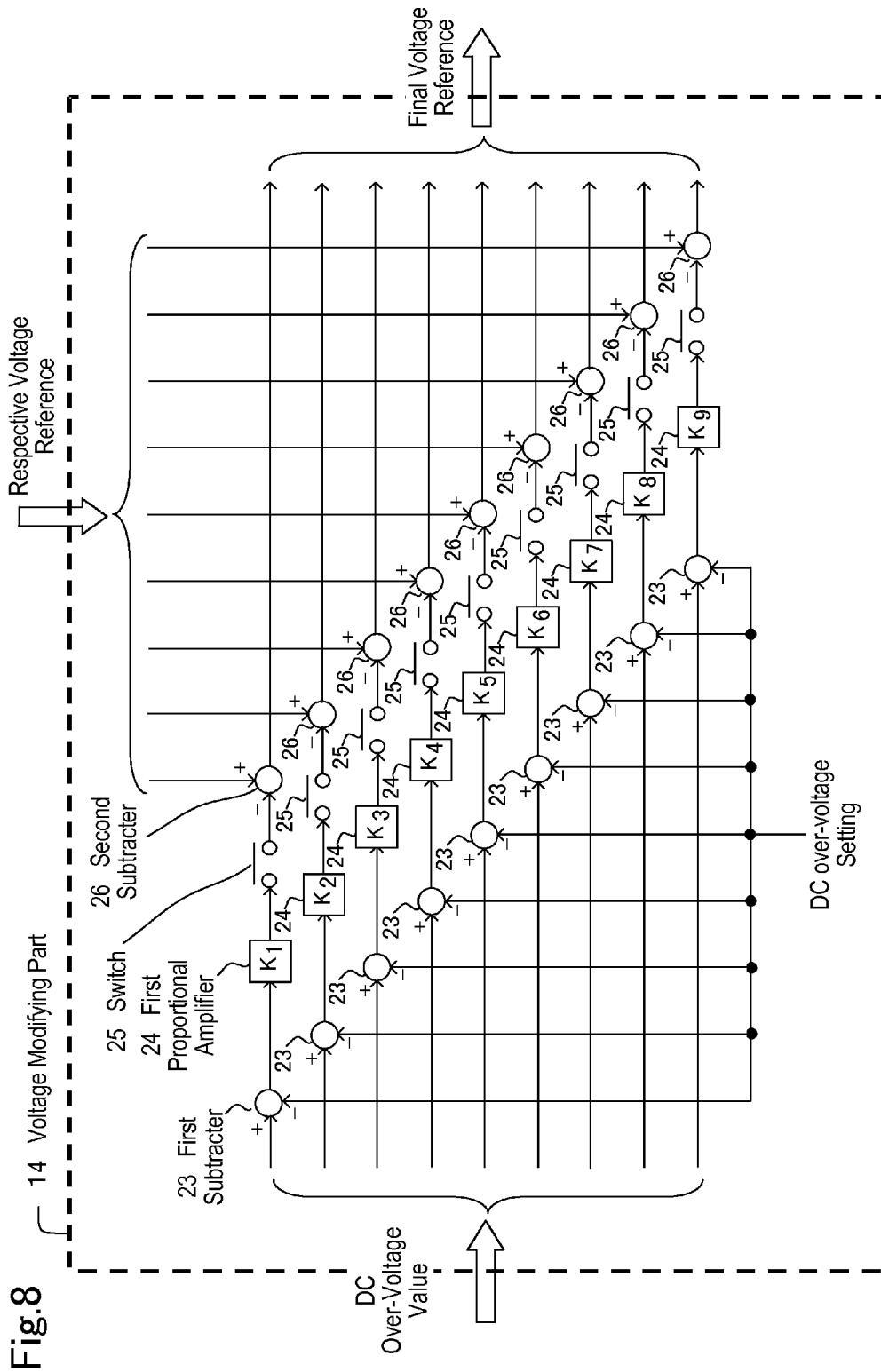
FIG. 8 is a block diagram showing a configuration example of a voltage modifying part of an embodiment of the present invention.

With reference to FIG. 8, the operation of the voltage modifying part 14 will be described. In the diagram, when the number of the power cells 32 connected in series in each phase is "n" (FIG. 8 shows the case where n=3), the voltage modifying part 14 has 3n first subtracters 23, 3n first proportional amplifiers 24, 3n switches 25, and 3n second subtracters 26. The voltage modifying part 14 determines the final voltage reference to each of the power cells as follows. In the state $S_1$, all of the switches 25 are off, and respective voltage references are set as final voltage references. Since the respective voltage reference $V_{cell}i$ is obtained by dividing the output phase voltage reference instructed for each output phase by the number of power cells 32 connected to the output phase as described above, the final voltage reference is calculated by equation (1).

$$V_{cell}i = V_{out}/n \, (i=1 \text{ to } n) \quad (1)$$

$V_{out}$ denotes an output phase voltage reference for one phase of output formed by the power cells 32 connected in series. Further, "i" denotes a numerical value from 1 to n, and $V_{cell}i$ designated by the numerical value is a numerical value expressing the respective voltage reference to the power cell 32 connected in the "i"th stage in the power cells 32 connected in series in the output phase to which the output phase voltage reference $V_{out}$ is instructed.

In the another state $S_2$, the voltage modifying part 14 detects the power cell 32 in which the DC over-voltage signal is turned on among the "n" power cells 32, turns on the switch 25 corresponding to the detected power cell 32, determines the final voltage reference $V_{cell1}i_j$ by equation (2) in the second subtracter 26, and sets it to be smaller than the final voltage reference in the state $S_1$.

$$V_{cell}i_j = V_{out}/n - \triangle V_{ij} \, (j=1 \text{ to } k) \quad (2)$$

"$i_j$" denotes a numerical value expressing the stage of the power cell 32 which is in the state $S_2$ in the output phase in which the power cells 32 are connected in series, k denotes the number of power cells 32 which are in the state $S_2$ in the output phase in which the power cells 32 are connected, and $\triangle V_{ij}$ denotes a decrease amount of an output voltage reference determined from a DC voltage (DC over-voltage) of the power cell 32 for each of the power cells 32 which are in the state $S_2$. As an example of determining $\triangle V_{ij}$, there is a method of applying proportional control of obtaining a deviation between the set voltage value $V_{ref}$ and the DC over-voltage by the first subtracter 23 and determining $\triangle V_{ij}$ in proportional to the deviation in FIG. 8. Specifically, proportional constant $Ki_j$ is introduced, and $\triangle Vi_j$ is determined by equation (3) by the first proportional amplifier 24.

$$\triangle Vi_j = Ki_j(V_{dc}i_j - V_{ref})(j=1 \text{ to } k) \qquad (3)$$

Here, $V_{dc}i_j$ denotes a DC over-voltage. In the state $S_2$, $V_{dc}i_j > V_{ref}$. Consequently, $\triangle Vi_j$ determined by the equation (3) is positive. Therefore, $V_{cell}i_j$ determined by the equation (2) is smaller than $V_{out}/n$.

Figure 9:
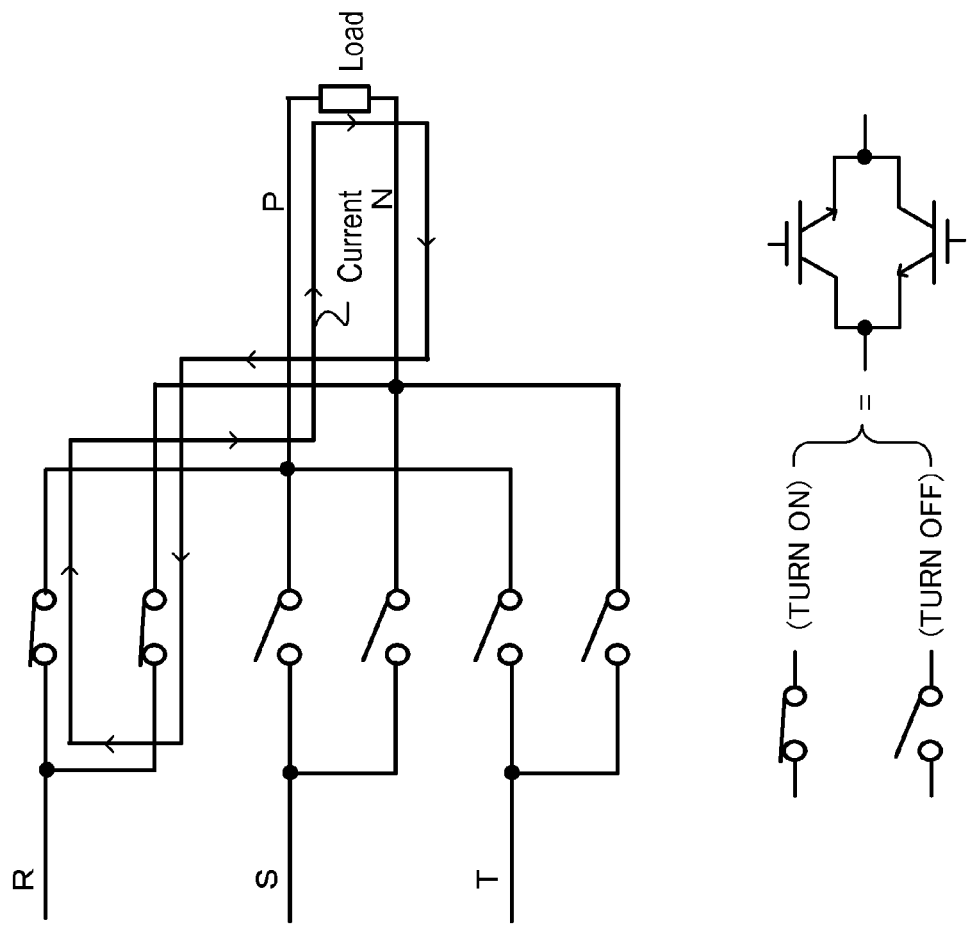
FIG. 9 is a main circuit diagram of a single phase matrix converter, showing the flow of a current when a zero voltage is outputted.

In the power cell 32 in which the output voltage reference becomes small, time of outputting a zero voltage becomes longer by pulse width modulating means of the single-phase matrix converter 1 usually employed. The zero voltage is outputted when two output terminals of the power cell 32 are connected to the same phase in the input three phases, and the two output terminals are set to the same potential. FIG. 9 is a main circuit diagram of a single phase matrix converter, showing the flow of a current when a zero voltage is outputted. In the diagram, the two output terminals of the single phase matrix converter 1 are expressed as a P terminal and an N terminal, and the input phase of the single phase matrix converter 1 to which the two terminals are connected while the zero voltage is outputted is the R phase. When it is assumed that a zero voltage output current flows to the P terminal, the load, and the N terminal in order, as shown in the diagram, by outputting the zero voltage, the output current of the single phase matrix converter 1 flows in the route of the P terminal, the load, the N terminal, a semiconductor switching element for connecting the N terminal and the R phase, the R phase, a semiconductor switching element for connecting the P terminal and the R phase, and the P terminal and does not flow over to the input side. Therefore, the amount of flow of a regeneration current to the input side decreases, so that an increase in the DC voltage of the snubber circuit is suppressed.

As described above, by the operation of the voltage modifying part 14, although the voltage references to all of the power cells 32 connected in series are equal in the state $S_1$, the voltage reference varies among the power cells 32 in the state $S_2$. The output voltage of the power cell 32 in which the DC voltage of the snubber circuit 6 becomes larger than the set voltage value $V_{ref}$ becomes small, and an increase in the DC voltage of the power cells 32 is suppressed. The output voltage of the output phase of the series-connected multi-level matrix converter 34 including the power cells 32 becomes smaller than the output phase voltage reference $V_{out}$ of the phase.

In the case of employing a current control loop, for example, like a vector control rule of a motor for generation of the output phase voltage reference $V_{out}$, when the current does not flow like the reference value due to a decrease in the output voltage of the power cell 32, the current control loop corrects the output phase voltage reference $V_{out}$ so as to be increased and operates so that the current as the reference value flows. Consequently, the influence on the performance of the series-connected multi-level matrix converter 34 is small. However, in the case where the current control loop like the V/f constant control rule of a motor is not employed for generation of the output phase voltage reference $V_{out}$, a decrease in the output voltage of the power cell 32 by the operation of the voltage modifying part 14 exerts an influence on the performance of the series-connected multi-level matrix converter 34. Such a case can be addressed by performing the following operation by the voltage modifying part 14 in addition to the operations according to the equations (2) and (3). For each of the power cells 32 in which the DC voltage detection value does not become larger than the set voltage value $V_{ref}$, the final voltage reference is determined by equation (4) and is made larger than the final voltage reference in the state $S_1$ determined by the equation (1).

$$V_{cell}i = V_{out}/n + \triangle Vi (i=1 \text{ to } n, i \text{ is not equal to } i_j, j=1 \text{ to } k) \qquad (4)$$

Here, $\triangle Vi$ denotes an increase amount of the output voltage reference for each power cell 32 in which the DC voltage detection value does not become larger than the voltage set value $V_{ref}$ and is determined so as to satisfy equation (5).

$$\sum_{i=1}^{n(\neq I_j)} \triangle Vi - \sum_{j=1}^{k} \triangle Vi_j = 0 \qquad (5)$$

As a concrete example of determining $\triangle Vi$, there is a method of employing equation (6) by setting $\triangle Vi$ as equal values.

$$\triangle Vi = \left(\sum_{j=1}^{k} \triangle Vi_j\right) / (n-k) \qquad (6)$$

By such operation of the voltage modifying part 14, in the case where all of the power cells 32 in the series-connected multi-level matrix converter 34 are in the state $S_1$, the voltage references to all of the power cells 32 connected in series are equal, and their total is the output phase voltage reference $V_{out}$. However, in the case where even one of the power cells 32 is in the state $S_2$, the final voltage reference is changed while satisfying the equation (5) or (6). Consequently, the total of the output voltage reference values of the power cells 32 connected in series does not change but becomes the output phase voltage reference $V_{out}$. The output voltage value of the series-connected multi-level matrix converter 34 remains the same in both of the states $S_1$ and $S_2$. Therefore, even in the case where the V/f constant control rule having no current control loop is employed for generation of the output phase voltage reference, an increase in the DC voltage of the snubber circuit 6 of the power cell 32 can be suppressed without exerting an influence on the performance.

Figure 3:
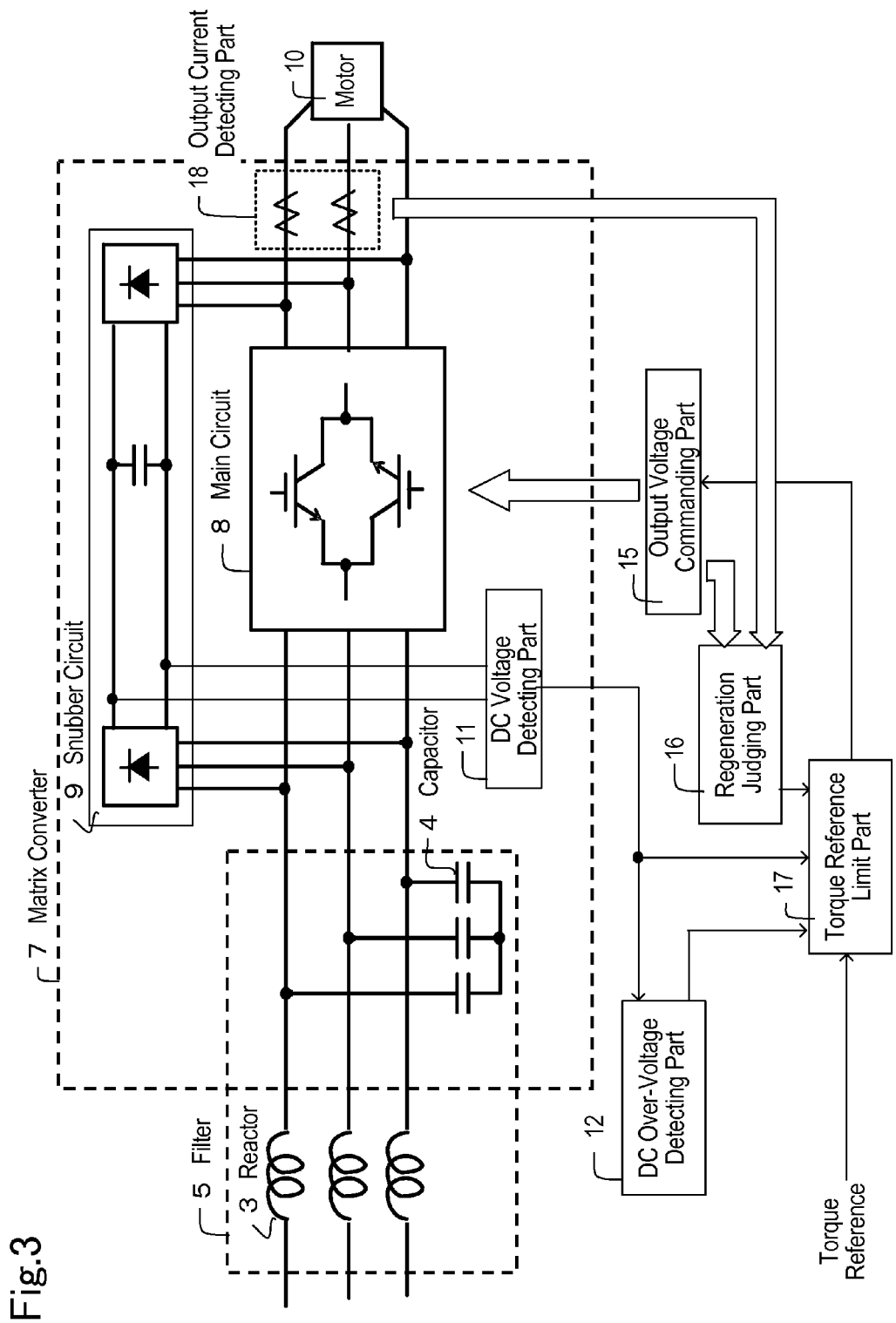
FIG. 3 is a block diagram of a control apparatus for a matrix converter as a second embodiment of the present invention.

FIG. 3 is a block diagram of a control apparatus for a matrix converter as a second embodiment. In the diagram, the control apparatus for the matrix converter has a matrix converter 7, the DC over-voltage detecting part 12, an output voltage commanding part 15, a regeneration judging part 16, and a torque reference limit part 17. The matrix converter 7 has the filter 5, a main circuit 8, a snubber circuit 9, the DC voltage detecting part 11, and an output current detecting part 18. The filter 5 has the reactor 3 and the capacitor 4. The matrix converter 7 outputs a three-phase alternating current from a three-phase input power source, and is different from that of the detailed diagram of the power cell of FIG. 2 of the first embodiment only with respect to a point that the main circuit 8 outputs a three-phase alternating current and, accompanying the point, a point that the number of connection places of the snubber circuit 9 to the main circuit 8 is three. Since the filter 5, the reactor 3, the capacitor 4, the DC voltage detecting part 11, and the DC over-voltage detecting part 12 are the same as those in FIG. 2, the detailed description will not be repeated. A motor 10 is driven by the matrix converter 7 and is connected on the output side of the matrix converter 7. The output current detecting part 18 detects an output current of the matrix converter by a current transformer (CT) or a hall device and outputs it as an output current detection value.

The output voltage commanding part 15 employs a generally and widely known vector control law of generating, by output phases, an output phase voltage reference for making a motor generate, based on an output current detection value outputted from an output current detecting part 19 and a torque reference, a torque according to the torque reference. The main circuit 8 is driven by a gate signal obtained by generally-known pulse width modulating means of the matrix converter based on the output phase voltage reference and performs bidirectional power conversion. The torque reference is generated by a speed controller for inputting a not-shown speed reference and a speed detected by a speed detecting part or obtained by directly setting a torque outputted from the motor 10. However, the embodiment is not related to those modes, so that detailed description will not be repeated. The regeneration judging part 16 determines whether the matrix converter is being in regenerating operation or not from the output phase voltage reference and the output current detection value, and the torque reference limit part 17 regulates a torque reference.

Next, the operation of the regeneration judging part 16 and the torque reference limit part 17 will be described.

The DC over-voltage detecting part 12 determines a state of the DC voltage of the snubber circuit 9 of the matrix converter 7, which is the state $S_1$ or the state $S_2$ in a manner similar to the first embodiment.

Figure 10:
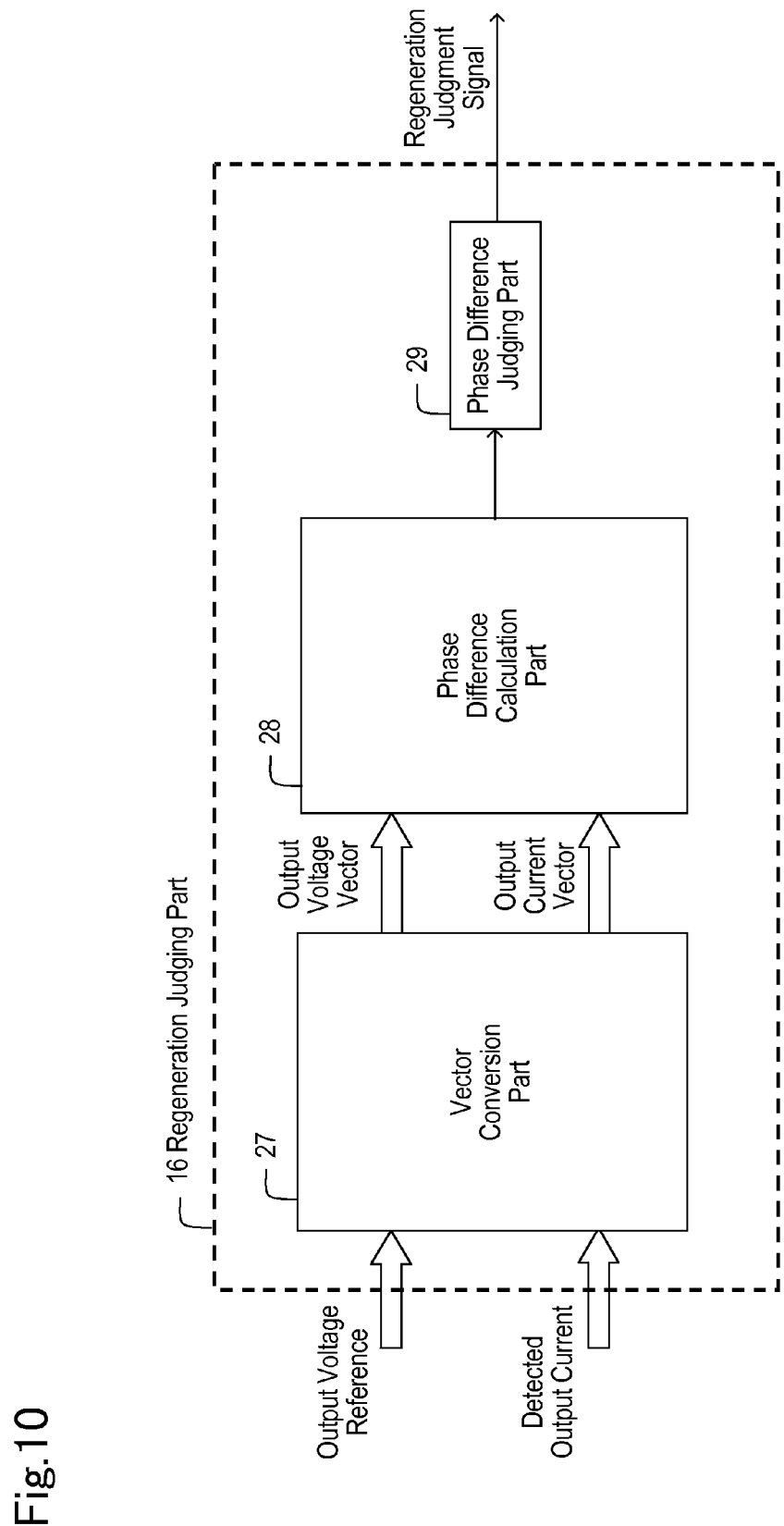
FIG. 10 is a block diagram showing a configuration example of a regeneration judging part of an embodiment of the present invention.

FIG. 10 shows a configuration example of the regeneration judging part 16. In the diagram, the regeneration judging part 16 has a vector conversion part 27, a phase difference calculation part 28, and a phase difference judging part 29. The regeneration judging part 16 obtains the phase difference $\phi$ between the output voltage and the output current from the output phase voltage reference generated by the output voltage commanding part 15 and the output current detection value outputted from the output current detecting part 18. To obtain the phase difference $\phi$, the vector conversion part 27 converts each of output phase voltage references of three phases and output current detection values of three phases to a vector amount on a d-q coordinate by a three-phases to two-phases (d and q axes) conversion which is generally and widely known. The vector conversion part 27 outputs an output voltage vector converted from the output phase voltage reference and an output current vector converted from the output current detection value. The phase difference $\phi$ is an angle formed by the two vectors, and the phase difference calculation part 28 calculates the angle formed by the two vectors. An example of a concrete calculation method will be described. First, the phase angle $\theta$ of the output voltage and the output current will be defined below. Here, X expresses a vector of a voltage, a current, or the like. It is generally satisfied that X is an output voltage vector or an output current vector. Therefore, X may be an output voltage vector or an output current vector. Further, $X_d$ denotes a d-axis component of the vector X, and $X_q$ expresses a q-axis component of the vector X.

When $X_d \geq 0, X_q \geq 0$, $\theta = \sin^{-1}(X_d/\sqrt{(X_d^2+X_q^2)})$
When $X_d \geq 0, X_q < 0$ or $X_d < 0, X_q < 0$, $\theta = \pi - \sin^{-1}(X_d/\sqrt{(X_d^2+X_q^2)})$
When $X_d < 0, X_q \geq 0$, $\theta = 2\pi + \sin^{-1}(X_d/\sqrt{(X_d^2+X_q^2)})$ The phase angle $\theta$ is an angle formed by the vector X and the d axis. When a phase angle $\theta$ obtained with respect to the output current is expressed as $\theta i_{out}$ and a phase angle $\theta$ obtained with respect to the output voltage is expressed as $\theta v_{out}$, the phase difference $\phi$ between the output voltage and the output current can be obtained by equation (7).

$$\phi = \theta v_{out} - \theta i_{out} \tag{7}$$

The phase difference calculation part 28 calculates the phase difference $\phi$ between the output voltage and the output current by the equation (7). The phase difference judging part 29 determines that the matrix converter is in motoring operation or regenerating operation by the following determining method.

When $-2\pi \leq \phi \leq (-3/2)\pi$, $-\pi/2 \leq \phi \leq \pi/2$, $(3/2)\pi \leq \phi \leq 2\pi$, it is determined that the matrix converter is in the motoring operation.

When $(-3/2)\pi < \phi < -\pi/2$, $\pi/2 < \phi < (3/2)\pi$, it is determined that the matrix converter is in the regenerating operation.

In such a manner, the regeneration judging part 16 determines that the present operation is the motoring operation or the regenerating operation.

Next, the torque reference limit part 17 will be described with reference to FIG. 11. In the diagram, the torque reference limit part 17 has a third subtracter 36, a second proportional amplifier 37, a switch 38, and a second torque reference renewal part 42. The third subtracter 36 calculates a deviation between the set voltage value $V_{ref}$ and a DC voltage $V_{dc}$ detected by the DC voltage detecting part 11. Next, the torque reference limit part 17 calculates a decrease amount $\triangle T_x$ of the torque reference absolute value. As an example of determining the decrease amount $\triangle T_x$ of the torque reference absolute value, there is a method of applying proportional control of making the amount proportional to the deviation between the set voltage value $V_{ref}$ and the DC voltage $V_{dc}$. Specifically, a proportional constant K is introduced, and $\triangle T_x$ is determined by equation (9) by the second proportional amplifier 37.

$$V_{error} = V_{dc} - V_{ref} \tag{8}$$

$$\triangle T_x = K V_{error} \tag{9}$$

where $V_{error}$ denotes a deviation between the set voltage value $V_{ref}$ and the DC voltage $V_{dc}$, and K denotes the proportional constant.

Next, a torque reference renewal part 39 of the torque reference limit part 17 calculates an absolute value $|T_{ref}|$ of a torque reference $T_{ref}$, and calculates a new torque reference $T_{ref}$, from the absolute value and $\triangle T_x$ as an output of the proportional amplifier by equation (10).

$$T_{ref} = \text{sign}(T_{ref}) \cdot (|T_{ref}| - \triangle T_x) \tag{10}$$

where sign $(T_{ref})$ denotes the sign of $T_{ref}$. $\triangle T_x$ denotes a decrease amount of the torque reference.

In the state $S_2$, $V_{dc} > V_{ref}$. Consequently, $\triangle T_x$ determined by the equation (9) is positive. Therefore, the absolute value of $T_{ref}$ determined by the equation (10) is smaller than $T_{ref}$. Since the absolute value of the torque reference becomes small, the torque actually generated from the motor 10 also becomes small.

When the regeneration judging part 16 determines that the matrix converter is in the regenerating operation and the DC voltage of the snubber circuit 9 is larger than the set voltage value $V_{ref}$, the torque reference limit part 17 turns on the switch 38 to change the torque reference $T_{ref}$ to a new torque reference T' by the equations (8) to (10). Consequently, the regeneration torque of the motor 10 decreases and a regeneration current decreases. Therefore, even when a failure occurs in the load of the motor 10 and an excessive regeneration load state is obtained, an increase in the DC voltage of the snubber circuit 9 can be suppressed to be the set voltage value $V_{ref}$ or less. Even when the capacitance of a discharge circuit of the snubber circuit 9 is not increased, the snubber circuit 9 and the capacitor 4 of the filter 5 can be prevented from entering an over-voltage state.

Figure 4:
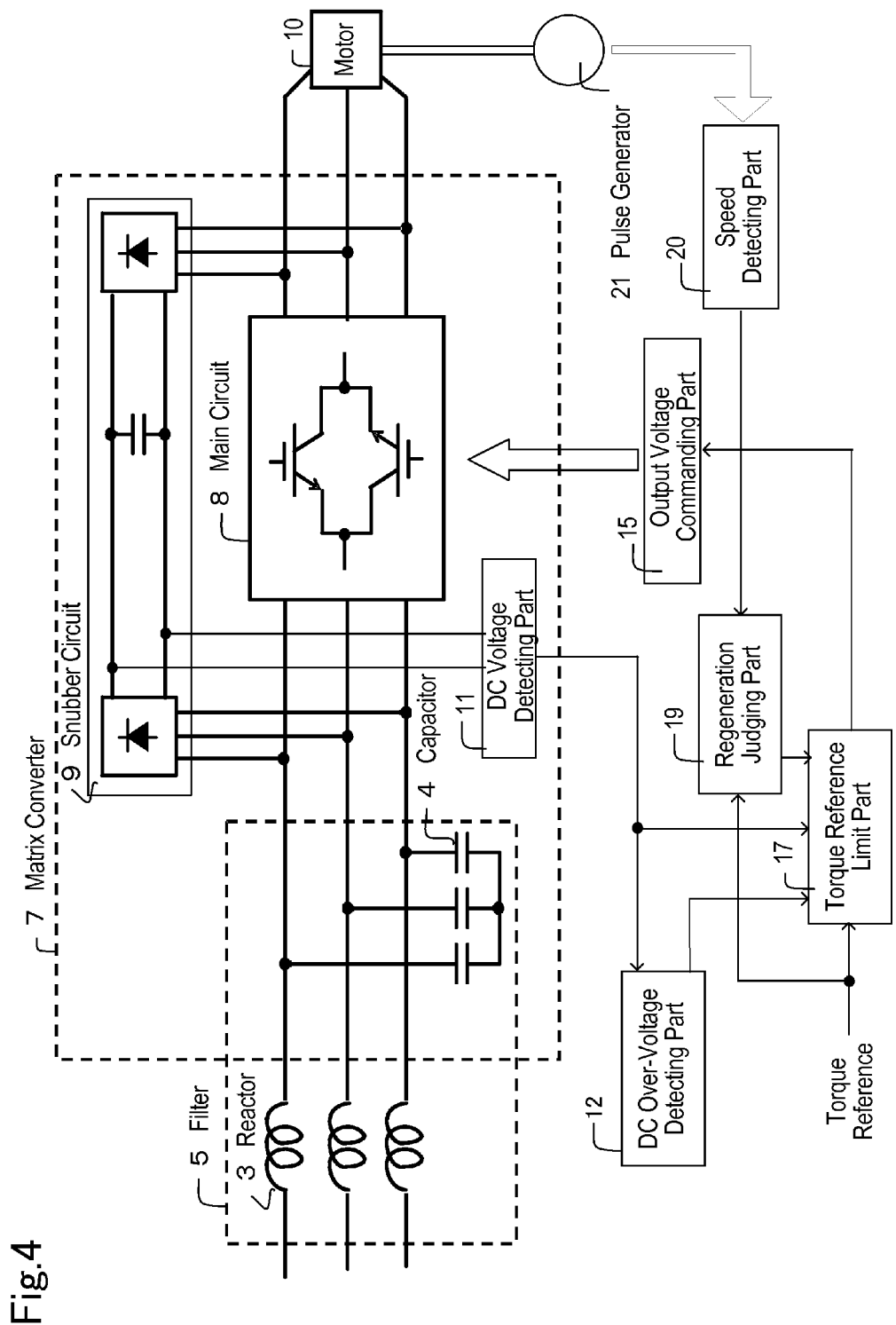
FIG. 4 is a block diagram of a control apparatus for a matrix converter as a third embodiment of the present invention.

FIG. 4 is a block diagram of a control apparatus for a matrix converter as a third embodiment. In the diagram, the control apparatus for the matrix converter has the matrix converter 7, the DC over-voltage detecting part 12, the output voltage commanding part 15, the torque reference limit part 17, the regeneration judging part 19, and a speed detecting part 20. The matrix converter 7 has the filter 5, the main circuit 8, the snubber circuit 9, and the DC voltage detecting part 11. The filter 5 has the reactor 3 and the capacitor 4. The motor 10 is connected on the output side of the matrix converter 7 and has a pulse generator 21. Description of the same components as those of FIG. 3 will not be repeated. Different components will be described below.

The third embodiment is different from the second embodiment with respect to a point that the speed detecting part 20 is provided and the regeneration judging part 19 determines whether the matrix converter is in the regenerating operation or not from the torque reference and speed detected by the speed detecting part 20.

Generally, in the case of using a motor as a load, when a rotational direction of the motor and a direction of a torque generated by the motor are opposite, the matrix converter performs the regenerating operation. Therefore, the speed detecting part 20 of the embodiment detects a rotational speed of the motor including the rotational direction. By comparing the rotational direction with the direction of the torque instructed by the torque reference at that time, whether the matrix converter is in the regenerating operation or not can be determined. The speed detecting part 20 of the embodiment counts pulse signals from the pulse generator 21 attached to the motor 10 and outputting two pulse signals having a phase difference of 90 degrees, and simultaneously detects a rotational speed and a rotational direction of the motor 10 in order to detect the speed and the direction.

Figure 12:
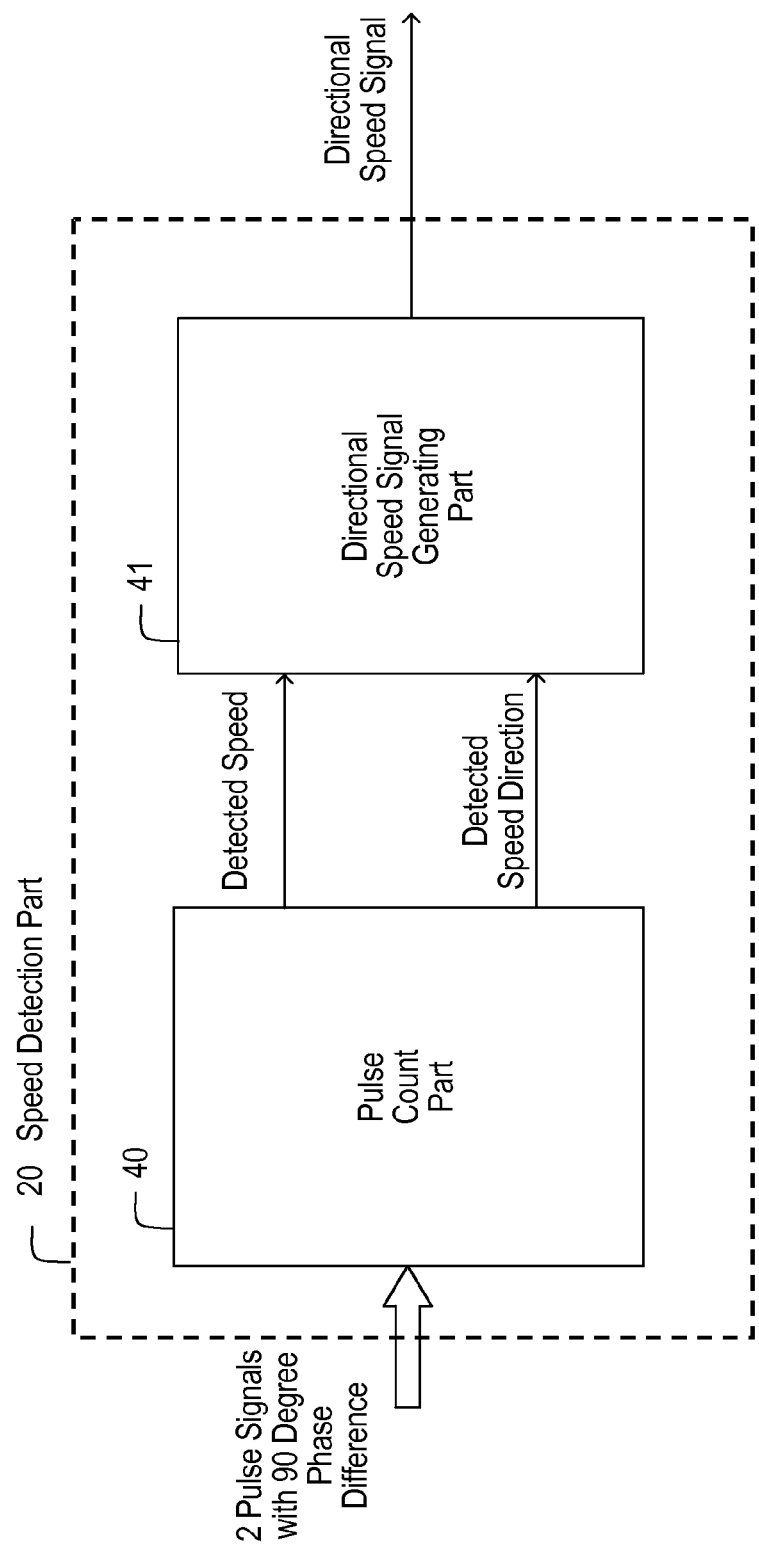
FIG. 12 is a block diagram showing a configuration example of a speed detecting part of an embodiment of the present invention.

FIG. 12 shows a configuration example of the speed detecting part 20. In the diagram, the speed detecting part 20 has a pulse count part 40 and a directional speed signal generating part 41. The pulse count part 40 simultaneously detects the rotational speed and the rotational direction of the motor 10 to which the pulse generator 21 for outputting pulses is attached from two pulse signals having a phase difference of 90 degrees by a known method. The directional speed signal generating part 41 obtains a speed detection value by adding the detected rotational direction as the sign (positive sign + or negative sign −) to the detected speed and makes the definition of the direction and the sign the same as the definition of the direction and the sign of a torque reference similarly expressing the direction in the sign.

The regeneration judging part 19 has a sign determining part, compares the sign of the speed detection value outputted from the speed detecting part 20 and the sign of the torque reference and, determines that the matrix converter is in the regenerating operation when the signs are different from each other, and determines that the matrix converter is in the motoring operation when the signs coincide with each other.

Figure 11:
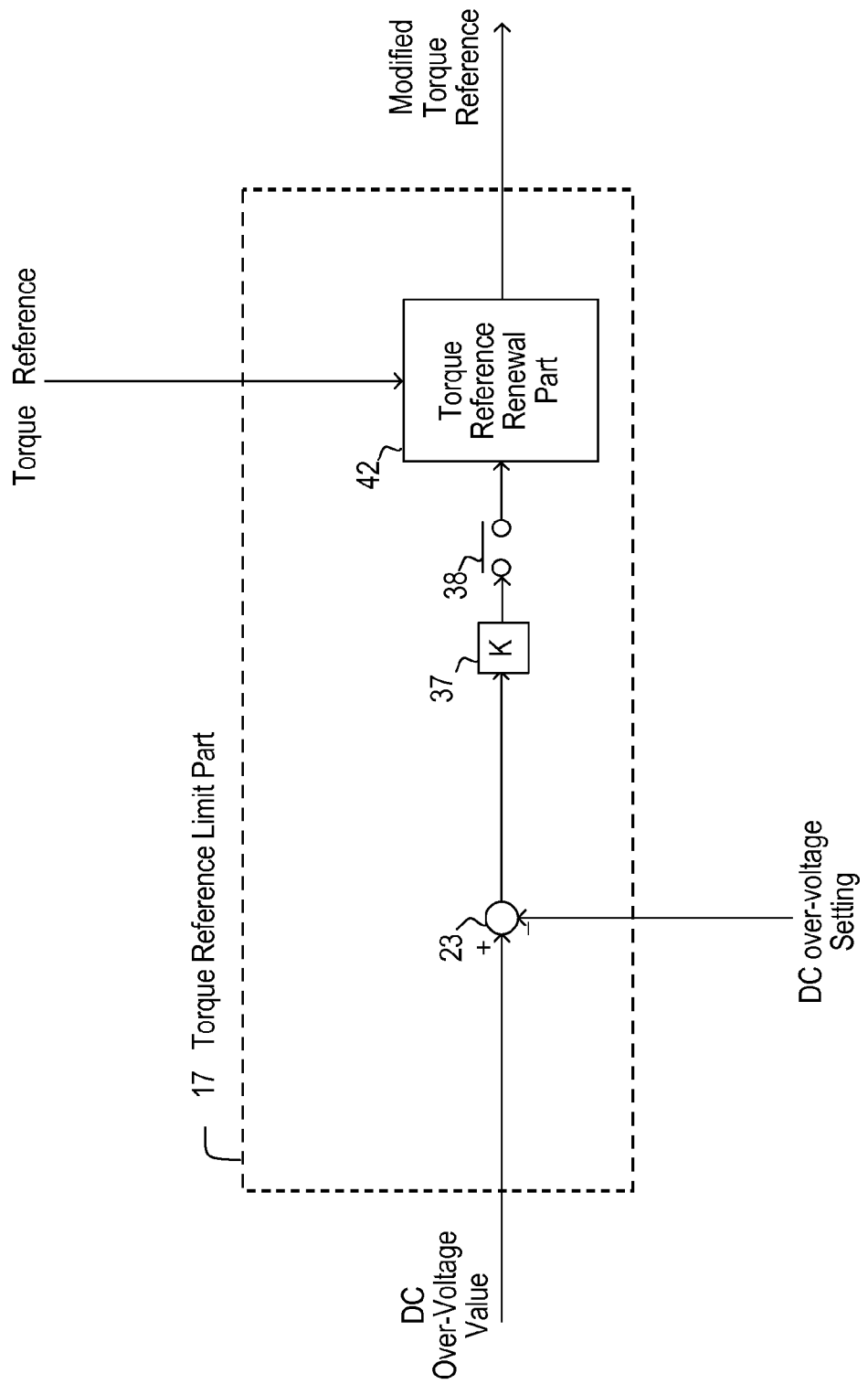
FIG. 11 is a block diagram showing a configuration example of a torque reference limit part of an embodiment of the present invention.

The torque reference limit part 17 is constructed as shown in FIG. 11 in a manner similar to the second embodiment and has the third subtracter 36, the switch 38, the second proportional amplifier 37, and the torque reference renewal part 42. When the DC over-voltage detecting part 12 turns on the DC over-voltage signal, the torque reference limit part 17 searches the determination result of the regeneration judging part 19 and, when the result shows that the matrix converter is in the regenerating operation, turns on the switch 38 to change the torque reference to a new torque reference $T_{ref}$ by the equations (8) to (10), thereby preventing the regeneration current from flowing to the input of the matrix converter 7, and suppressing a rise in the DC voltage of the snubber circuit 9.

Next, the fourth embodiment of the present invention will be described with reference to the drawings. In the fourth embodiment, the second embodiment of the invention is applied to the control apparatus for a series-connected multi-level matrix converter in which a power cell is connected to each of a plurality of secondary windings of a transformer, and outputs of the power cells are connected in series.

Figure 5:
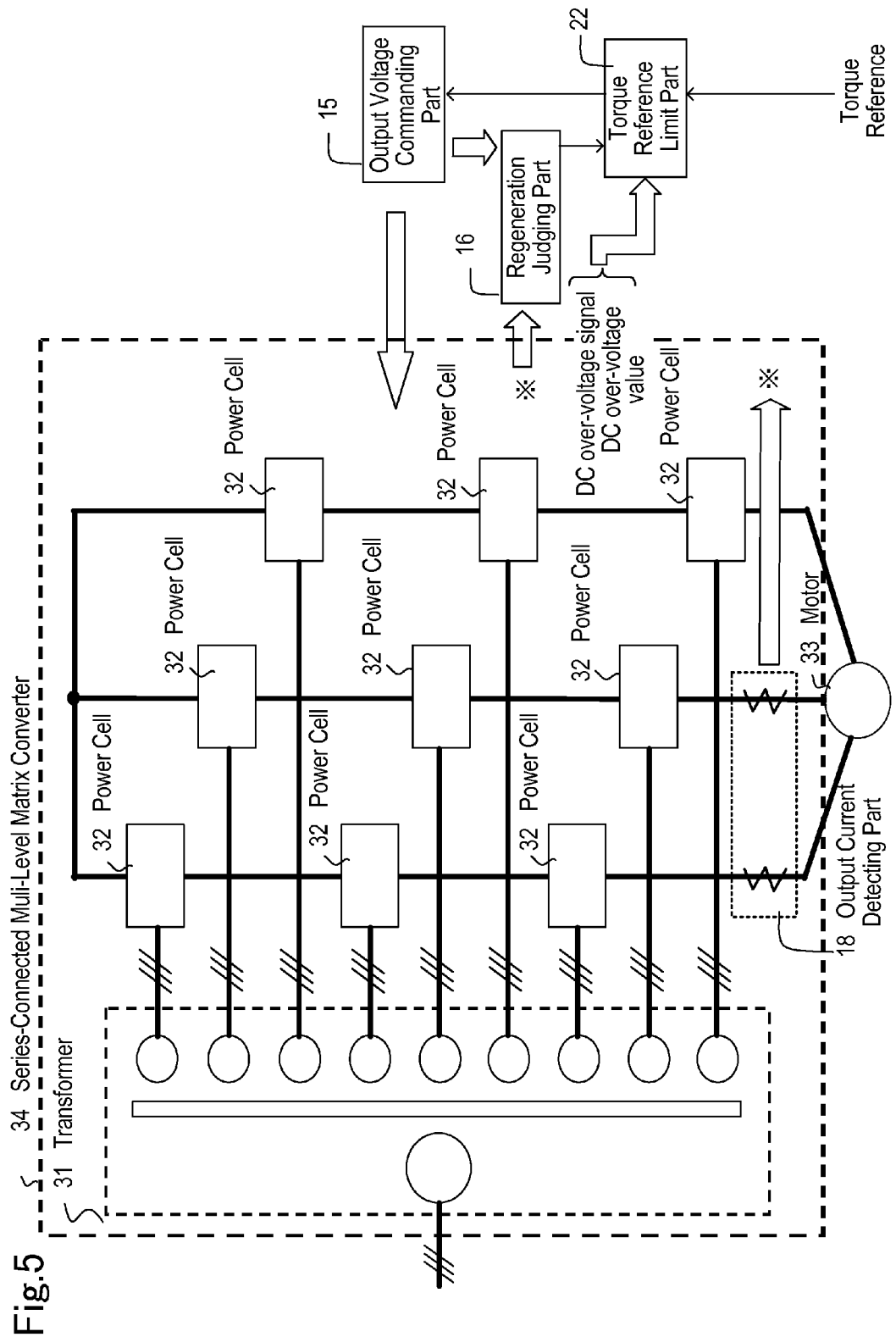
FIG. 5 is a block diagram of a control apparatus for a series-connected multi-level matrix converter as a fourth embodiment of the present invention.

FIG. 5 is configuration diagram of a control apparatus for a series-connected multi-level matrix converter as the fourth embodiment. In the diagram, the control apparatus for the series-connected multi-level matrix converter has the series-connected multi-level matrix converter 34, the output current detecting part 18, the output voltage commanding part 15, the regeneration judging part 16, and the torque reference limit part 17. The series-connected multi-level matrix converter 34 has the transformer 31 and the plurality of power cells 32. The transformer 31 has a plurality of secondary windings for transforming an input voltage to an input voltage of each of the power cells. The power cell 32 is a single-phase matrix converter which receives a secondary voltage of the transformer 31 and outputs a single-phase AC voltage. A motor 33 is driven by the series-connected multi-level matrix converter 34 and is connected to the output side of the series-connected multi-level matrix converter 34. The power cell 32 is the same as that in FIG. 1 illustrating the first embodiment. Since the configuration of the power cell 32 is as shown in FIG. 2 of the first embodiment, the detailed description will not be repeated.

Like in FIG. 3 illustrating the second embodiment, the output voltage commanding part 15 generates an output phase voltage reference for making the motor 33 generate a torque according to the torque reference from the torque reference. The output phase voltage reference is converted to voltage reference to each of the power cells 32 by a not-shown respective voltage commanding part. The converting method includes a method of dividing the output phase voltage reference by the number of the power cells 32 connected in series per output phase in a manner similar to the first embodiment. The embodiment can be applied regardless of the converting method. The output current detecting part 18 detects an output current of the series-connected multi-level matrix converter 34. In a manner similar to the second embodiment, the regeneration judging part 16 has the vector conversion part, the phase difference calculation part, and the phase difference judging part, obtains the phase difference between the output voltage and the output current from the output phase voltage reference and the output current detection value outputted from the output current detecting part 18 by the equation (7), and determines whether the matrix converter is in the regenerating operation or not.

Figure 13:
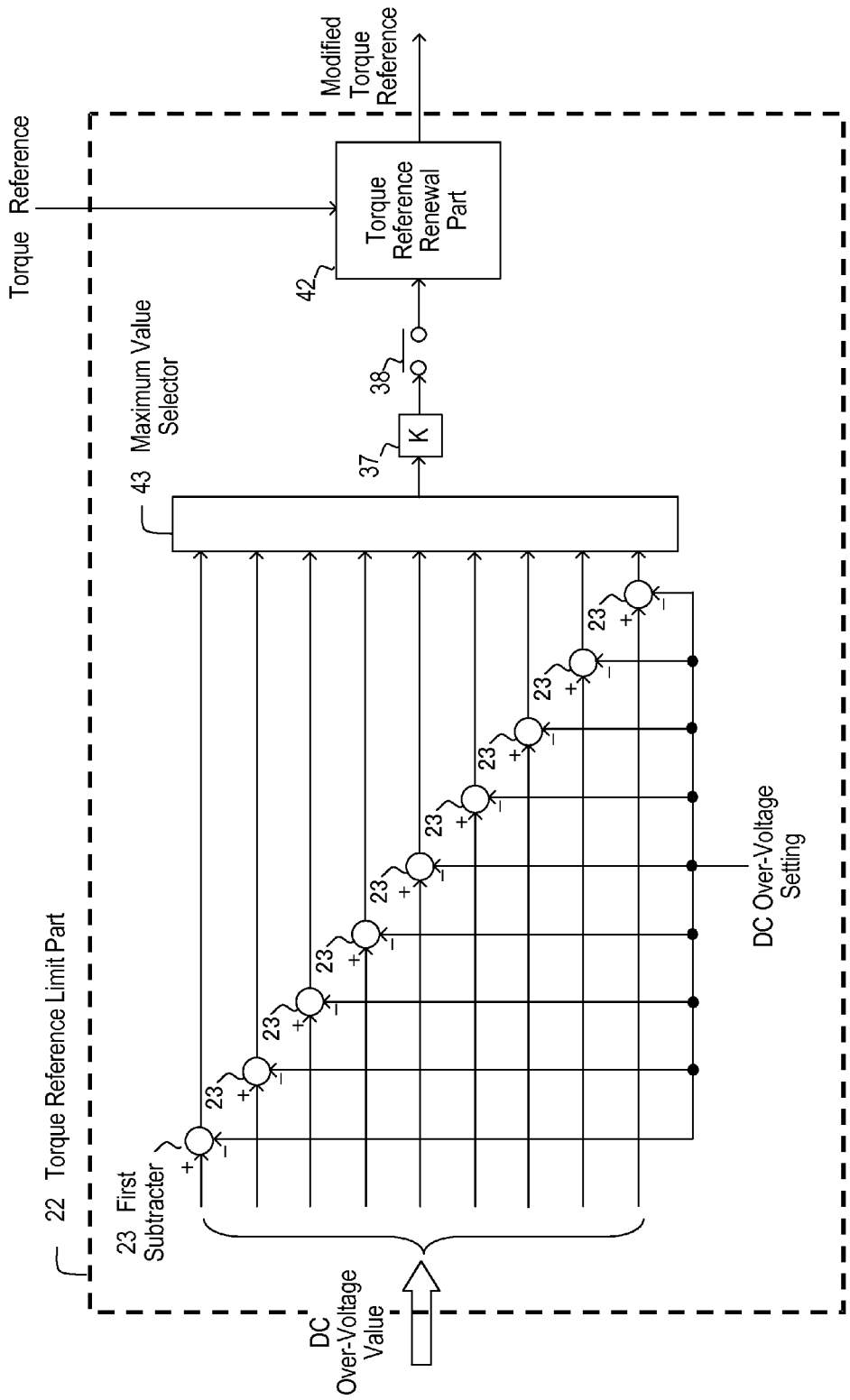
FIG. 13 is a block diagram showing another configuration example of the torque reference limit part of an embodiment of the present invention.

The fourth embodiment is different from the second embodiment with respect to a torque reference limit part 22. FIG. 13 shows a configuration example of the torque reference limit part 22 in the embodiment. In the diagram, when the number of power cells 32 connected in series in each phase is "n" (FIG. 13 shows the case where n=3), the torque reference limit part 22 has 3n first subtracters 23, a maximum value selector 43, the second proportional amplifier 37, the switch 38, and the torque reference renewal part 42. Different from the second embodiment, the torque reference limit part 22 receives the DC over-voltage outputted from the DC voltage detecting part 11 and the DC over-voltage signal outputted from the DC over-voltage detecting part 12 shown in FIG.

2 from all of the power cells 32. The first subtracter 23 calculates deviations between the DC over-voltage of all of the power cells 32 and the set voltage value $V_{ref}$. The maximum value selector 43 selects the largest deviation from the deviations and sets as $V_{error}$. When the regeneration judging part 16 determines that the matrix converter is in the regenerating operation and the DC over-voltage detecting part 12 turns on a DC over-voltage signal in at least one power cell 32, the torque reference limit part 22 turns on the switch 38, and the torque reference renewal part 42 calculates a new torque reference $T_{ref}$ from the deviation $V_{error}$ obtained as described above by using the equations (9) and (10). In such a manner, the second embodiment can be quite similarly applied also to the series-connected multi-level matrix converter 34.

By setting the torque reference $T_{ref}$ in the regenerating operation to the new torque reference $T_{ref}$, by the equation (10), the regeneration current flowing to the input side of each of the power cells 32 in the series-connected multi-level matrix converter 34 decreases, and since the decrease amount of the torque reference is determined from the DC over-voltage of the power cell 32 having the largest DC over-voltage, even when a failure occurs in the load of the motor 33 and an excessive regeneration load state is obtained, excess from $V_{ref}$ of the DC voltage detection value of the snubber circuit 6 of all of power cells 32 is suppressed, and the snubber circuit 6 and, further, the capacitor 4 of the input filter 5 can be prevented from entering the over-load state.

In the fifth embodiment of the present invention, the third embodiment of the invention is applied to the control apparatus for a series-connected multi-level matrix converter in which a power cell is connected to each of a plurality of secondary windings of a transformer, and outputs of the power cells are connected in series. The control apparatus for the series-connected multi-level matrix converter has the output voltage commanding part 15 shown in FIG. 5, and the power cell 32 has a configuration shown in FIG. 2. In a manner similar to the third embodiment, as shown in FIG. 12, the speed detecting part 20 has the pulse count part 40 and the directional speed signal generating part 41. The pulse count part 40 counts pulse signals from the pulse generator 21 attached to the motor 33 to detect a rotational speed and a rotating method of the motor 33. The directional speed signal generating part 41 obtains a speed detection value by adding the detected rotational direction as the sign to the speed and makes the definition of the direction and the sign the same as the definition of the direction and the sign of a torque reference similarly expressing the direction in the sign. The regeneration judging part 19 compares the sign of the torque reference and the sign of the speed detection value outputted from the speed detecting part 20 in the sign determining part and, determines that the matrix converter is in the regenerating operation when the signs are different from each other. As shown in FIG. 13, when the number of power cells 32 connected in series in each phase is "n" (FIG. 13 shows the case where n=3), the torque reference limit part 22 has 3n first subtracters 23, the maximum value selector 43, the second proportional amplifier 37, the switch 38, and the torque reference renewal part 42. The torque reference limit part 22 performs the same operation as that of the fourth embodiment. When the regeneration judging part 19 determines that the matrix converter is in the regenerating operation and the DC over-voltage detecting part 12 turns on a DC over-voltage signal in at least one power cell 32, the torque reference limit part 22 turns on the switch 38, and the first subtracter 23 calculates deviations between the DC over-voltage and the set voltage $V_{ref}$, the maximum value selector 43 selects the largest deviation among the deviations as the deviation $V_{error}$, the second proportional amplifier 37 calculates a decrease amount $\Delta T_x$ of the torque reference absolute value by the equation (9), and the torque reference renewal part 42 calculates a new torque reference $T_{ref}$ by the equation (10). With such a configuration, the third embodiment can be quite similarly applied also to the control apparatus for the series-connected multi-level matrix converter 34.

Next, the sixth embodiment of the present invention will be described with reference to the drawings. In the sixth embodiment, the second embodiment of the invention is applied to a parallel-connected multi-level matrix converter in which outputs of a plurality of power cells are connected in parallel.

Figure 6:
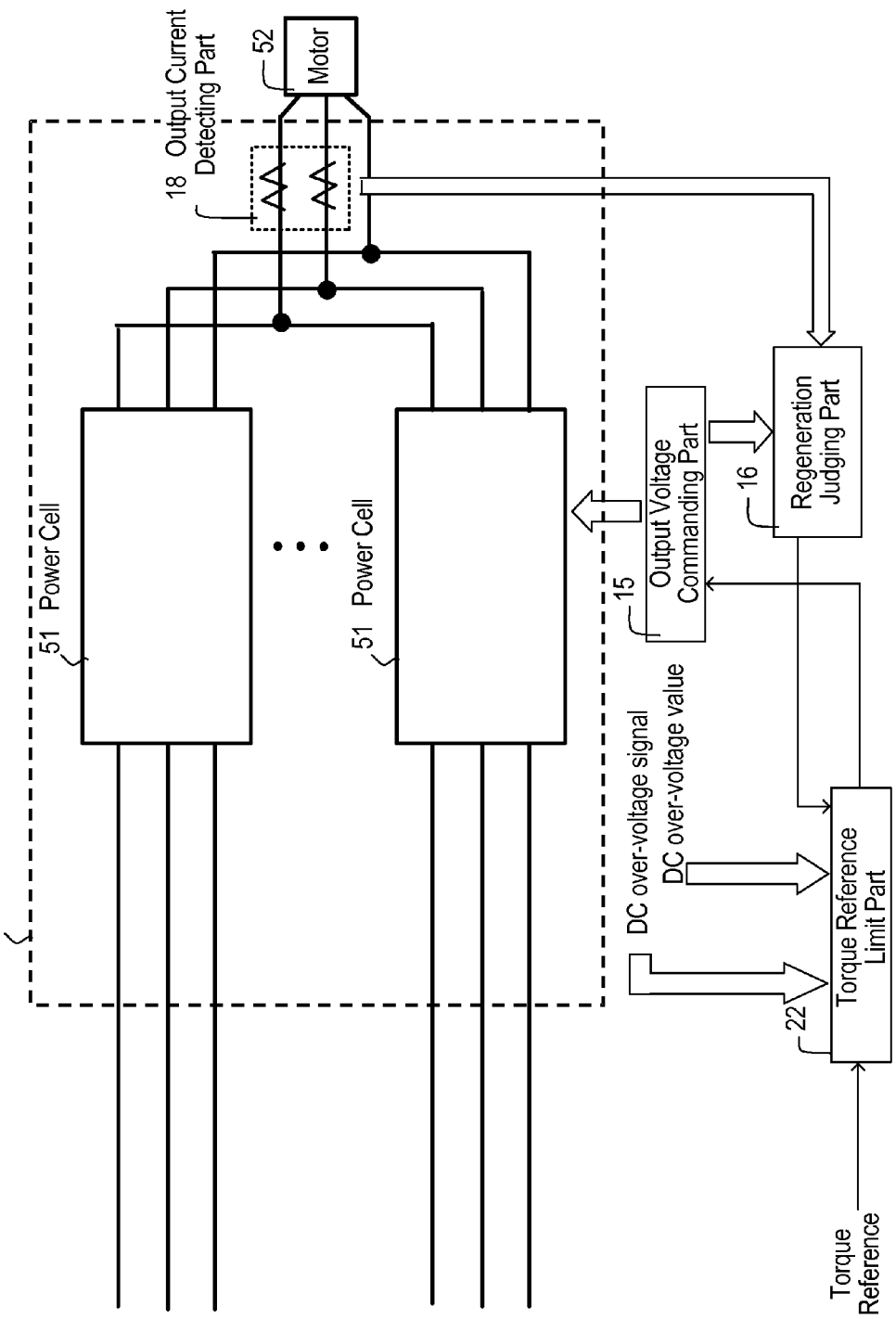
FIG. 6 is a block diagram of a control apparatus for a parallel-connected multi-level matrix converter as a sixth embodiment of the present invention.

FIG. 6 is a configuration diagram of a control apparatus for a parallel-connected multi-level matrix converter as the sixth embodiment. In the diagram, the control apparatus of the parallel-connected multi-level matrix converter includes a parallel-connected multi-level matrix converter 53 having a plurality of power cells 51, the output current detecting part 18, the output voltage commanding part 15, the regeneration judging part 16, and the torque reference limit part 22. The outputs of the power cells 51 are connected in parallel, and a motor 52 is driven by the parallel-connected multi-level matrix converter 53, and is connected on the output side of the parallel-connected multi-level matrix converter 53.

Figure 7:
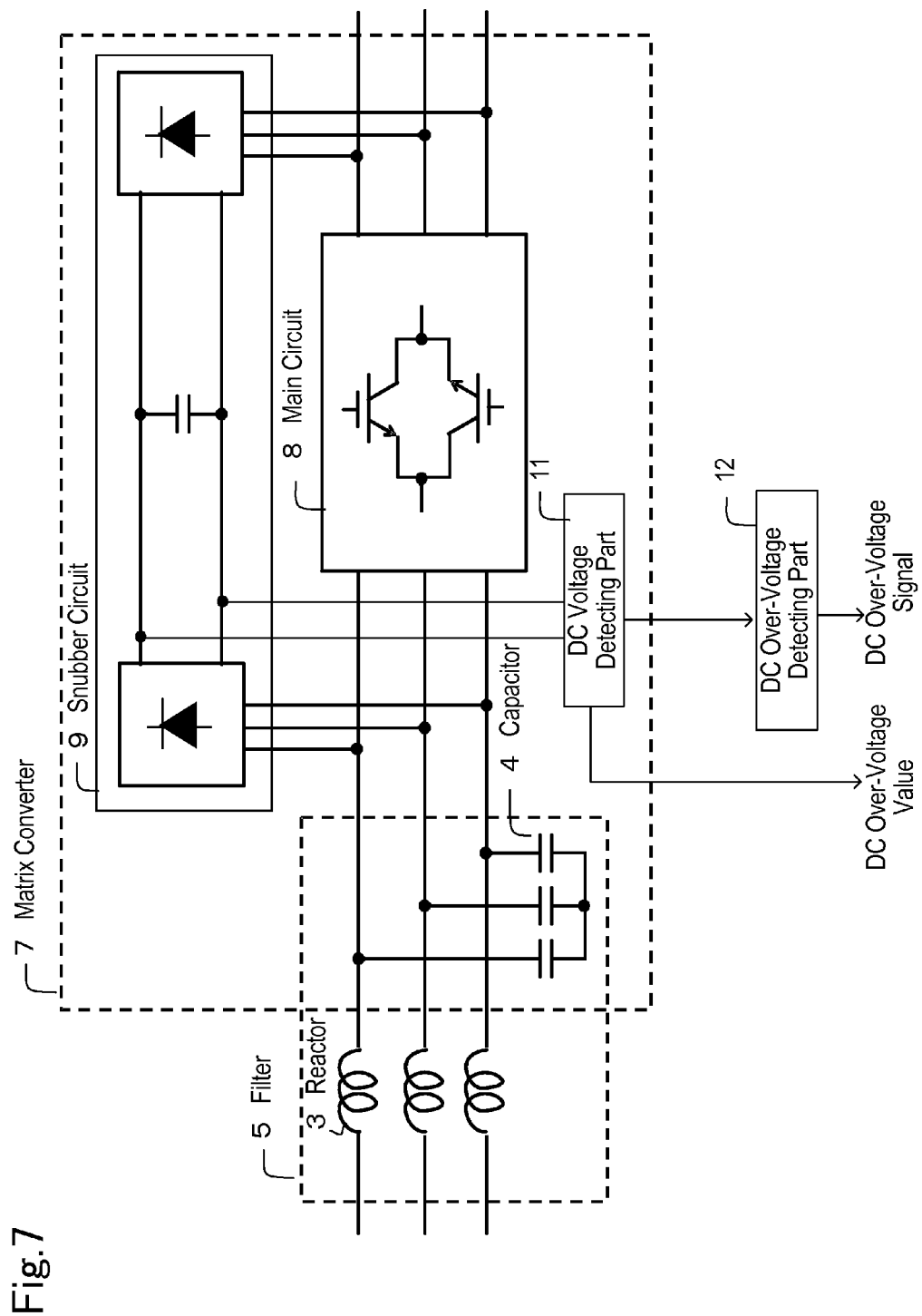
FIG. 7 is a detailed diagram of a power cell of the parallel-connected multi-level matrix converter.

The configuration of the power cell 51 is as shown in FIG. 7. The power cell 51 has the main circuit 2, the input filter 5, the snubber circuit 6, and the DC voltage detecting part 11. In the diagram, the power cell 51 has the matrix converter 7 and the DC over-voltage detecting part 12. The matrix converter 7 outputs a three-phase alternating current from a three-phase input power source, and is different from that of the detailed diagram of the power cell of FIG. 2 of the first embodiment and the fourth and fifth embodiments only with respect to a point that the main circuit 8 outputs a three-phase alternating current and, accompanying the point, a point that the number of connection places of the snubber circuit 9 to the main circuit 8 is three. The filter 5, the reactor 3, the capacitor 4, the DC voltage detecting part 11, and the DC over-voltage detecting part 12 are the same as those in FIG. 2.

The output voltage commanding part 15 generates an output phase voltage reference for making the motor 52 generate a torque according to the torque reference from the torque reference by output phases. The output phase voltage reference is equally given to all of the power cells 51. The output current detecting part 18 detects an output current of the parallel-connected multi-level matrix converter 53. As shown in FIG. 10, in a manner similar to the second embodiment, the regeneration judging part 16 has the vector conversion part 27, the phase difference calculation part 28, and the phase difference judging part 29, obtains the phase difference between the output voltage and the output current from the output phase voltage reference and the output current detection value outputted from the output current detecting part 18 by the equation (7), and determines whether the matrix converter is in the regenerating operation or not.

The sixth embodiment is different from the second embodiment with respect to the torque reference limit part 22. As shown in FIG. 13, when the number of power cells 51 connected in parallel is "n" (FIG. 13 shows the case where n=9), the torque reference limit part 22 has n first subtracters 23, the maximum value selector 43, the second proportional amplifier 37, the switch 38, and the torque reference renewal part 42. The first subtracter 23 calculates deviations between the DC over-voltage of all of the power cells 51 and the set voltage value $V_{ref}$. The maximum value selector 43 sets, as the deviation $V_{error}$, the largest deviation from the deviations calculated by the first subtracter 23. The second proportional amplifier calculates the decrease amount $\triangle T_x$ of the torque reference absolute value by the equation (9) from the deviation $V_{error}$ determined in such a manner. When any one of the DC over-voltage signals is turned on, the regeneration judging part 16 determines that the matrix converter is in the regenerating operation, and the DC over-voltage detecting part 12 shown in FIG. 7 turns on a DC over-voltage signal in at least one power cell 51, the torque reference limit part 22 turns on the switch 38, and the torque reference renewal part 42 changes the torque reference $T_{ref}$ to a new torque reference $T_{ref}$ by the equation (10) from $\triangle T_x$ calculated as described above. In such a manner, the second embodiment can be quite similarly applied also to the parallel-connected multi-level matrix converter 53.

By changing the torque reference in the regenerating operation to the new torque reference by the equation (10), the regeneration current flowing to the input side of each of the power cells 51 in the parallel-connected multi-level matrix converter 53 decreases, and since the decrease amount of the torque reference is determined from the DC over-voltage of the power cell 51 having the largest DC over-voltage, even when a failure occurs in the load of the motor 52 and an excessive regeneration load state is obtained, excess from $V_{ref}$ of the DC voltage detection value of the snubber circuit 9 of all of power cells 51 is suppressed, and the snubber circuit 9 and, further, the capacitor 4 of the input filter 5 can be prevented from entering the over-load state.

In a seventh embodiment of the present invention, the third embodiment of the invention is applied to a control apparatus for a parallel-connected multi-level matrix converter in which outputs of a plurality of power cells are connected in parallel. The control apparatus for the parallel-connected multi-level matrix converter includes the parallel-connected multi-level matrix converter 53 having a plurality of power cells 51, the speed detecting part 20, the output voltage commanding part 15, the regeneration judging part 19, and the torque reference limit part 22. The outputs of the power cells 51 are connected in parallel, and the motor 52 is driven by the parallel-connected multi-level matrix converter 53, and is connected on the output side of the parallel-connected multi-level matrix converter 53. The configuration of the power cell 51 is as shown in FIG. 7. In a manner similar to the third embodiment, as shown in FIG. 12, the speed detecting part 20 has the pulse count part 40 and the directional speed signal generating part 41. The pulse count part 40 counts pulse signals from the pulse generator 21 attached to the motor 52 to detect a rotational speed and a rotating method of the motor 52. The directional speed signal generating part 41 obtains a speed detection value by adding the detected rotational direction as the sign to the speed and makes the definition of the direction and the sign the same as the definition of the direction and the sign of a torque reference similarly expressing the direction in the sign. The regeneration judging part 19 compares the sign of the torque reference and the sign of the speed detected by the speed detecting part 20 in the sign determining part and, determines that the matrix converter is in the regenerating operation when the signs are different from each other. As shown in FIG. 13, when the number of power cells 51 connected in parallel is "n" (FIG. 13 shows the case where n=9), the torque reference limit part 22 has n first subtracters 23, the maximum value selector 43, the second proportional amplifier 37, the switch 38, and the torque reference renewal part 42. The first subtracter 23 calculates deviations between the DC over-voltage of all of the power cells 51 and the set voltage value $V_{ref}$. The maximum value selector 43 sets, as the deviation $V_{error}$, the largest deviation from the deviations calculated by the first subtracter 23. The second proportional amplifier calculates the decrease amount $\triangle T_x$ of the torque reference absolute value by the equation (9) from the deviation $V_{error}$ determined in such a manner. When the regeneration judging part 19 determines that the matrix converter is in the regenerating operation, and the DC over-voltage detecting part 12 shown in FIG. 7 turns on a DC over-voltage signal in at least one power cell 51, the torque reference limit part 22 turns on the switch 38 and calculates the decrease amount $\triangle T_x$ of the torque reference absolute value by the equation (9), and the torque reference renewal part 42 calculates a new torque reference $T_{ref}$ by the equation (10). With such a configuration, the third embodiment can be quite similarly applied also to the control apparatus for the parallel-connected multi-level matrix converter 53.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A control apparatus for a series-connected multi-level matrix converter, comprising:
    each voltage commanding device provided for each of single-phase matrix converters to generate a voltage reference to each of the single-phase matrix converters, from an output phase voltage reference for an output phase voltage of the series-connected multi-level matrix converter, the series-connected multi-level matrix converter including the single-phase matrix converters whose outputs are serially connected and which are connected to a plurality of secondary windings of a transformer and constructing output phases, the single-phase matrix converters each including
        a main circuit having a bidirectional switching element,
        a snubber circuit connected to an input and an output of the main circuit to suppress a surge voltage, and
        a DC voltage detecting section configured to detect a DC voltage of the snubber circuit to output a DC voltage detection value,
    the transformer having a primary winding connected to a three-phase AC power source and the plurality of secondary windings;
    a DC over-voltage detector configured to output a DC over-voltage signal when the DC voltage detection value exceeds a set voltage value which is preliminarily set; and
    a voltage modifying device, when the DC over-voltage signal is outputted, configured to decrease the voltage reference to a corresponding single-phase matrix converter among the single-phase matrix converters based on a deviation between the DC voltage detection value and the set voltage value.

2. The control apparatus for a series-connected multi-level matrix converter according to claim 1,
    wherein the voltage modifying device includes
        a first subtracter configured to obtain a deviation between the DC voltage detection value and the set voltage value for each of the single-phase matrix converters,
        a proportional amplifier configured to multiply the deviation with a proportional constant,
        a second subtracter configured to subtract an output of the proportional amplifier from the voltage reference, and
        a switch to switch the output of the proportional amplifier in accordance with the DC over-voltage signal.

3. A control apparatus for a series-connected multi-level matrix converter, comprising:
an output current detector configured to detect an output current to a three-phase motor to be driven to output an output current detection value;
a first regeneration judging device configured to calculate a phase difference between an output voltage and an output current based on an output phase voltage reference for an output phase voltage of the series-connected multi-level matrix converter and the output current detection value, and configured to determine that the series-connected multi-level matrix converter is in one of motoring operation and regenerating operation to output a determination result, the series-connected multi-level matrix converter including single-phase matrix converters whose outputs are serially connected and which are connected to a plurality of secondary windings of a transformer and constructing output phases, the single-phase matrix converters each including
a main circuit having a bidirectional switching element,
a snubber circuit connected to an input and an output of the main circuit to suppress a surge voltage, and
a DC voltage detecting section configured to detect a DC voltage of the snubber circuit to output a DC voltage detection value,
the transformer having a primary winding connected to a three-phase AC power source and the plurality of secondary windings;
a torque reference limit device, when the determination result is the regenerating operation and the DC voltage detection value is larger than a set voltage value which is preliminarily set, configured to change a torque reference for a torque which is outputted from the three-phase motor to a new torque reference to decrease the torque based on a deviation between the DC voltage detection value and the set voltage value in a corresponding single-phase matrix converter among the single-phase matrix converters, and configured to output the new torque reference; and
an output voltage commanding device configured to generate the output phase voltage reference from the new torque reference.

4. The control apparatus for a series-connected multi-level matrix converter according to claim 3,
wherein the first regeneration judging device includes
a vector converter configured to convert the output phase voltage reference and the output current detection value to an output voltage vector and an output current vector, respectively,
a phase difference calculator configured to calculate an angle formed by the output voltage vector and the output current vector and configured to set the angle as the phase difference between the output voltage and the output current, and
a phase difference judging section configured to determine that the series-connected multi-level matrix converter is in the regenerating operation when the phase difference is larger than $-(3/2)\pi$ radian and smaller than $-\pi/2$ radian or is larger than $\pi/2$ radian and smaller than $(3/2)\pi$ and configured to determine that the series-connected multi-level matrix converter is in the motoring operation when the phase difference lies between $-2\pi$ and $(-3/2)\pi$, between $-\pi/2$ and $\pi/2$, or between $(3/2)\pi$ and $2\pi$.

5. The control apparatus for a series-connected multi-level matrix converter according to claim 3,
wherein the torque reference limit device includes
a proportional amplifier configured to multiply a deviation between the DC voltage detection value and the set voltage value with a proportional constant for each of the single-phase matrix converters,
a maximum value selector configured to select a maximum output from outputs of the proportional amplifier, and a torque reference renewal section configured to subtract an output of the maximum value selector from an absolute value of the torque reference and configured to add a same sign as a sign of the torque reference to a subtraction result, thereby generating a new torque reference.

6. The control apparatus for a series-connected multi-level matrix converter according to claim 3, comprising:
in place of the output current detector, a speed detector configured to generate a speed detection value from a rotational speed and a rotational direction of the three-phase motor, and configured to output the speed detection value; and
a second regeneration judging device configured to determine that each of the single-phase matrix converters is in one of motoring operation and regenerating operation based on the speed detection value and the torque reference to output a determination result.

7. The control apparatus for a series-connected multi-level matrix converter according to claim 6,
wherein the speed detector has a direction speed signal generating section configured to add the rotational direction as a sign to the rotational speed and configured to make a definition of the rotational direction which is meant by one of positive and negative signs the same as a definition of a sign indicative of a torque generation direction added to the torque reference, and
wherein the second regeneration judging device is configured to determines that each of the single-phase the matrix converters is in the motoring operation when a sign of the speed detection value and a sign of the torque reference coincide with each other, and is configured to determine that each of the single-phase the matrix converters is in the regenerating operation when the sign of the speed detection value and the sign of the torque reference are different from each other.

8. The control apparatus for a series-connected multi-level matrix converter according to claim 6,
wherein the torque reference limit device includes
a proportional amplifier configured to multiply a deviation between the DC voltage detection value and the set voltage value with a proportional constant for each of the single-phase matrix converters,
a maximum value selector configured to select a maximum output from outputs of the proportional amplifier, and
a torque reference renewal section configured to subtract an output of the maximum value selector from an absolute value of the torque reference and configured to add a same sign as a sign of the torque reference to a subtraction result, thereby generating a new torque reference.

9. A control apparatus for a matrix converter, comprising:
an output current detector configured to detect an output current to a three-phase motor to be driven to output an output current detection value;
a first regeneration judging device configured to calculate a phase difference between an output voltage and an output current based on an output phase voltage reference for an output phase voltage of the matrix converter and the output current detection value, and configured to determine that the matrix converter is in one of motoring operation and regenerating operation to output a determination result, the matrix converter including
- a main circuit connected to a three-phase AC power source and having a bidirectional switching element,
- a snubber circuit connected to an input and an output of the main circuit to suppress a surge voltage, and
- a DC voltage detecting section configured to detect a DC voltage of the snubber circuit to output a DC voltage detection value;

a torque reference limit device, when the determination result is the regenerating operation and the DC voltage detection value is larger than a set voltage value which is preliminarily set, configured to change a torque reference for a torque which is outputted from the three-phase motor to a new torque reference to decrease the torque based on a deviation between the DC voltage detection value and the set voltage value in the matrix converter, and configured to output the new torque reference; and an output voltage commanding device configured to generate the output phase voltage reference from the new torque reference.

10. The control apparatus for a matrix converter according to claim 9,
wherein the first regeneration judging device includes
- a vector converter configured to convert the output phase voltage reference and the output current detection value to an output voltage vector and an output current vector, respectively,
- a phase difference calculator configured to calculate an angle formed by the output voltage vector and the output current vector and configured to set the angle as the phase difference between the output voltage and the output current, and
- a phase difference judging section configured to determine that the matrix converter is in the regenerating operation when the phase difference is larger than $-(3/2)\pi$ radian and smaller than $-\pi/2$ radian or is larger than $\pi/2$ radian and smaller than $(3/2)\pi$ and configured to determine that the matrix converter is in the motoring operation when the phase difference lies between $-2\pi$ and $(-3/2)\pi$, between $-\pi/2$ and $\pi/2$, or between $(3/2)\pi$ and $2\pi$.

11. The control apparatus for a matrix converter according to claim 9,
wherein the torque reference limit device includes
- a proportional amplifier configured to multiply the deviation between the DC voltage detection value and the set voltage value with a proportional constant, and
- a torque reference renewal section configured to subtract an output of the proportional amplifier from an absolute value of the torque reference and configured to add a same sign as a sign of the torque reference to a subtraction result, thereby generating a new torque reference.

12. The control apparatus for a matrix converter according to claim 9, comprising:
in place of the output current detector, a speed detector configured to generate a speed detection value from a rotational speed and a rotational direction of the three-phase motor, and configured to output the speed detection value; and
a second regeneration judging device configured to determine that the matrix converter is in one of the motoring operation and the regenerating operation based on the speed detection value and the torque reference to output a determination result.

13. The control apparatus for a matrix converter according to claim 12,
wherein the speed detector has a direction speed signal generating section configured to add the rotational direction as a sign to the rotational speed and configured to make a definition of the rotational direction which is meant by one of positive and negative signs the same as a definition of a sign indicative of a torque generation direction added to the torque reference, and
wherein the second regeneration judging device is configured to determine that the matrix converter is in the motoring operation when a sign of the speed detection value and a sign of the torque reference coincide with each other, and is configured to determine that the matrix converter is in the regenerating operation when the sign of the speed detection value and the sign of the torque reference are different from each other.

14. The control apparatus for a matrix converter according to claim 12,
wherein the torque reference limit device includes
- a proportional amplifier configured to multiply the deviation between the DC voltage detection value and the set voltage value with a proportional constant, and
- a torque reference renewal section configured to subtract an output of the proportional amplifier from an absolute value of the torque reference and configured to add a same sign as a sign of the torque reference to a subtraction result, thereby generating a new torque reference.

15. A control apparatus for a parallel-connected multi-level matrix converter, comprising:
an output current detector configured to detect an output current to a three-phase motor to be driven to output an output current detection value;
a first regeneration judging device configured to calculate a phase difference between an output voltage and an output current based on an output phase voltage reference for an output phase voltage of the parallel-connected multi-level matrix converter and the output current detection value, and configured to determine that the parallel-connected multi-level matrix converter is in one of motoring operation and regenerating operation to output a determination result, the parallel-connected multi-level matrix converter including matrix converters whose outputs are serially connected, the matrix converters each including
- a main circuit having a bidirectional switching element,
- a snubber circuit connected to an input and an output of the main circuit to suppress a surge voltage, and
- a DC voltage detecting section configured to detect a DC voltage of the snubber circuit to output a DC voltage detection value;

a torque reference limit device, when the determination result is the regenerating operation and the DC voltage detection value is larger than a set voltage value which is preliminarily set, configured to change a torque reference for a torque which is outputted from the three-phase motor to a new torque reference to decrease the torque based on a deviation between the DC voltage detection value and the set voltage value in a corresponding matrix converter among the matrix converters, and configured to output the new torque reference; and an output voltage commanding device configured to generate the output phase voltage reference from the new torque reference.

16. The control apparatus for a parallel-connected multi-level matrix converter according to claim 15, wherein the first regeneration judging device includes
a vector converter configured to convert the output phase voltage reference and the output current detection value to an output voltage vector and an output current vector, respectively,
a phase difference calculator configured to calculate an angle formed by the output voltage vector and the output current vector and configured to set the angle as the phase difference between the output voltage and the output current, and
a phase difference judging section configured to determine that the parallel-connected multi-level matrix converter is in the regenerating operation when the phase difference is larger than $-(3/2)\pi$ radian and smaller than $-\pi/2$ radian or is larger than $\pi/2$ radian and smaller than $(3/2)\pi$ and configured to determine that the parallel-connected multi-level matrix converter is in the motoring operation when the phase difference lies between $-2\pi$ and $(-3/2)\pi$, between $-\pi/2$ and $\pi/2$, or between $(3/2)\pi$ and $2\pi$.

17. The control apparatus for a parallel-connected multi-level matrix converter according to claim 15, wherein the torque reference limit device includes
a proportional amplifier configured to multiply a deviation between the DC voltage detection value and the set voltage value with a proportional constant for each of the matrix converters,
a maximum value selector configured to select a maximum output from outputs of the proportional amplifier, and a torque reference renewal section configured to subtract an output of the maximum value selector from an absolute value of the torque reference and configured to add a same sign as a sign of the torque reference to a subtraction result, thereby generating a new torque reference.

18. The control apparatus for a parallel-connected multi-level matrix converter according to claim 15, comprising:

in place of the output current detector, a speed detector configured to generate a speed detection value from a rotational speed and a rotational direction of the three-phase motor, and configured to output the speed detection value; and
a second regeneration judging device configured to determine that the parallel-connected multi-level matrix converter is in the one of the motoring operation and the regenerating operation based on the speed detection value and the torque reference to output a determination result.

19. The control apparatus for a parallel-connected multi-level matrix converter according to claim 18, wherein the speed detector has a direction speed signal generating section configured to add the rotational direction as a sign to the rotational speed and configured to make a definition of the rotational direction which is meant by one of positive and negative signs the same as a definition of a sign indicative of a torque generation direction added to the torque reference, and
wherein the second regeneration judging device is configured to determine that the parallel-connected multi-level matrix converter is in the motoring operation when a sign of the speed detection value and a sign of the torque reference coincide with each other, and is configured to determine that the parallel-connected multi-level matrix converter is in the regenerating operation when the sign of the speed detection value and the sign of the torque reference are different from each other.

20. The control apparatus for a parallel-connected multi-level matrix converter according to claim 18, wherein the torque reference limit device includes
a proportional amplifier configured to multiply a deviation between the DC voltage detection value and the set voltage value with a proportional constant for each of the matrix converters,
a maximum value selector configured to select a maximum output from outputs of the proportional amplifier, and a torque reference renewal section configured to subtract an output of the maximum value selector from an absolute value of the torque reference and configured to add a same sign as a sign of the torque reference to a subtraction result, thereby generating a new torque reference.

* * * * *